(12) United States Patent
Prahl et al.

(10) Patent No.: US 10,753,500 B2
(45) Date of Patent: Aug. 25, 2020

(54) VALVE ACTUATOR

(71) Applicant: ELKHART BRASS MANUFACTURING COMPANY, INC., Elkhart, IN (US)

(72) Inventors: Kevin A. Prahl, Elkhart, IN (US); Garry A. Lund, Edwardsburg, MI (US)

(73) Assignee: ELKHART BRASS MANUFACTURING COMPANY, INC., Elkhart, IN (US)

( * ) Notice: Subject to any disclaimer, the term of this patent is extended or adjusted under 35 U.S.C. 154(b) by 190 days.

(21) Appl. No.: 15/967,081

(22) Filed: Apr. 30, 2018

(65) Prior Publication Data

US 2018/0245705 A1    Aug. 30, 2018

Related U.S. Application Data

(63) Continuation of application No. 15/133,100, filed on Apr. 19, 2016, now Pat. No. 9,958,084.

(60) Provisional application No. 62/279,760, filed on Jan. 16, 2016, provisional application No. 62/323,619, filed on Apr. 15, 2016.

(51) Int. Cl.
*F16K 31/05* (2006.01)
*F16K 31/04* (2006.01)

(52) U.S. Cl.
CPC .......... *F16K 31/055* (2013.01); *F16K 31/042* (2013.01); *F16K 31/043* (2013.01)

(58) Field of Classification Search
CPC ..... F16K 31/055; F16K 31/042; F16K 31/043
USPC .................................................. 251/129.04
See application file for complete search history.

(56) References Cited

U.S. PATENT DOCUMENTS

| | | | | |
|---|---|---|---|---|
| 3,974,879 | A * | 8/1976 | Nelson, Jr. ............. | A62C 27/00 169/43 |
| 5,409,037 | A * | 4/1995 | Wheeler ............... | G01M 3/243 137/487.5 |
| 6,327,718 | B1 * | 12/2001 | Ono ......................... | E03D 9/08 4/420.2 |
| 6,337,635 | B1 * | 1/2002 | Ericksen .............. | A01G 25/165 137/624.11 |
| 6,561,481 | B1 * | 5/2003 | Filonczuk ............. | F16K 31/043 239/578 |
| 7,503,338 | B2 * | 3/2009 | Harrington .......... | A01G 25/162 137/355.16 |
| 8,843,241 | B2 * | 9/2014 | Saberi ..................... | H04Q 9/00 700/287 |
| 9,079,748 | B2 * | 7/2015 | Tracey ................... | A01G 25/16 |
| 9,295,862 | B2 * | 3/2016 | Cerrano ................ | G05B 15/02 |
| 2005/0199842 | A1 * | 9/2005 | Parsons .................... | E03D 3/02 251/129.04 |

* cited by examiner

*Primary Examiner* — John Bastianelli
(74) *Attorney, Agent, or Firm* — Taft Stettinius & Hollister LLP; Derek B. Lavender

(57) ABSTRACT

A combination mechanical/electrical valve actuator providing tactile feedback similar to a purely mechanical valve actuator is disclosed.

7 Claims, 28 Drawing Sheets

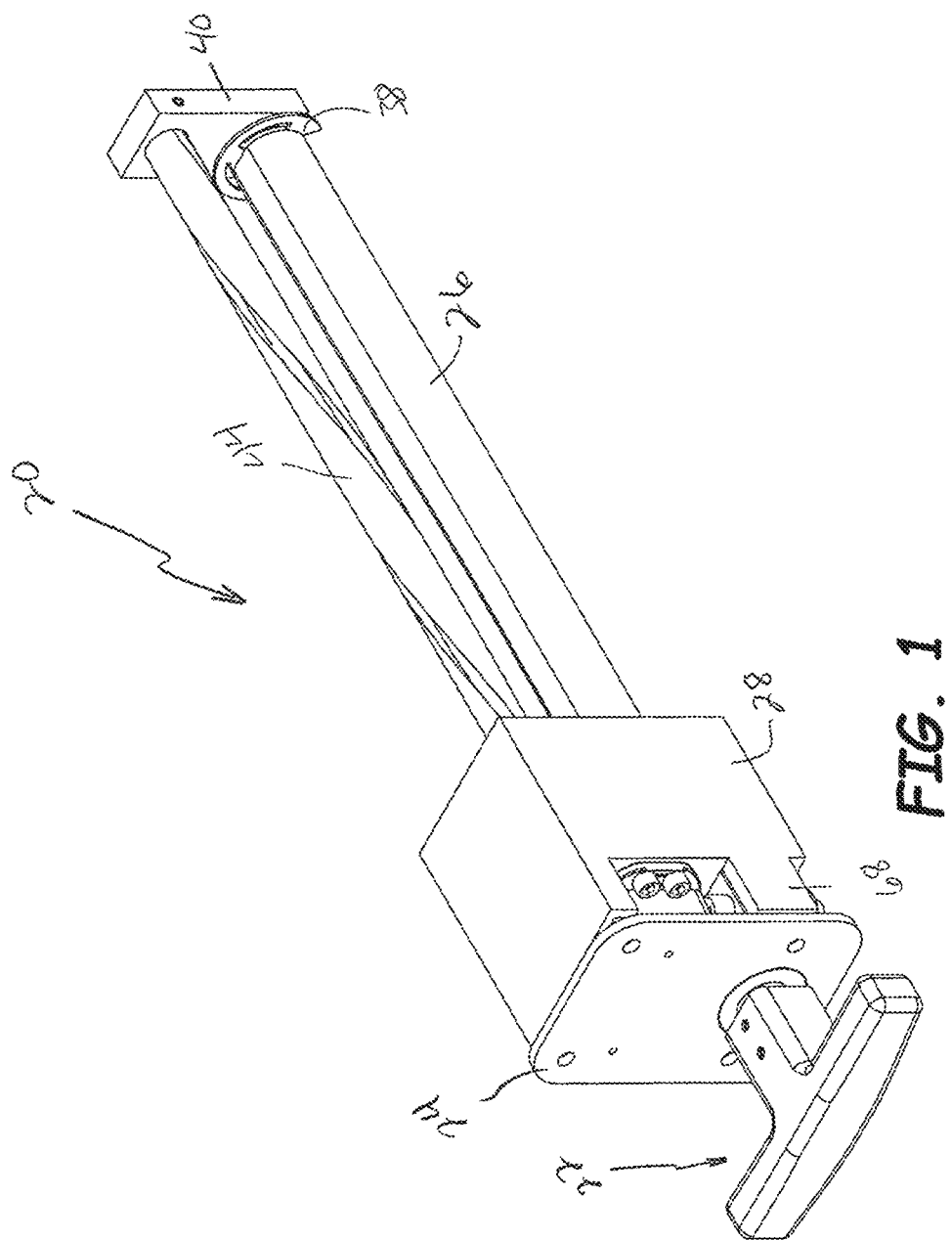

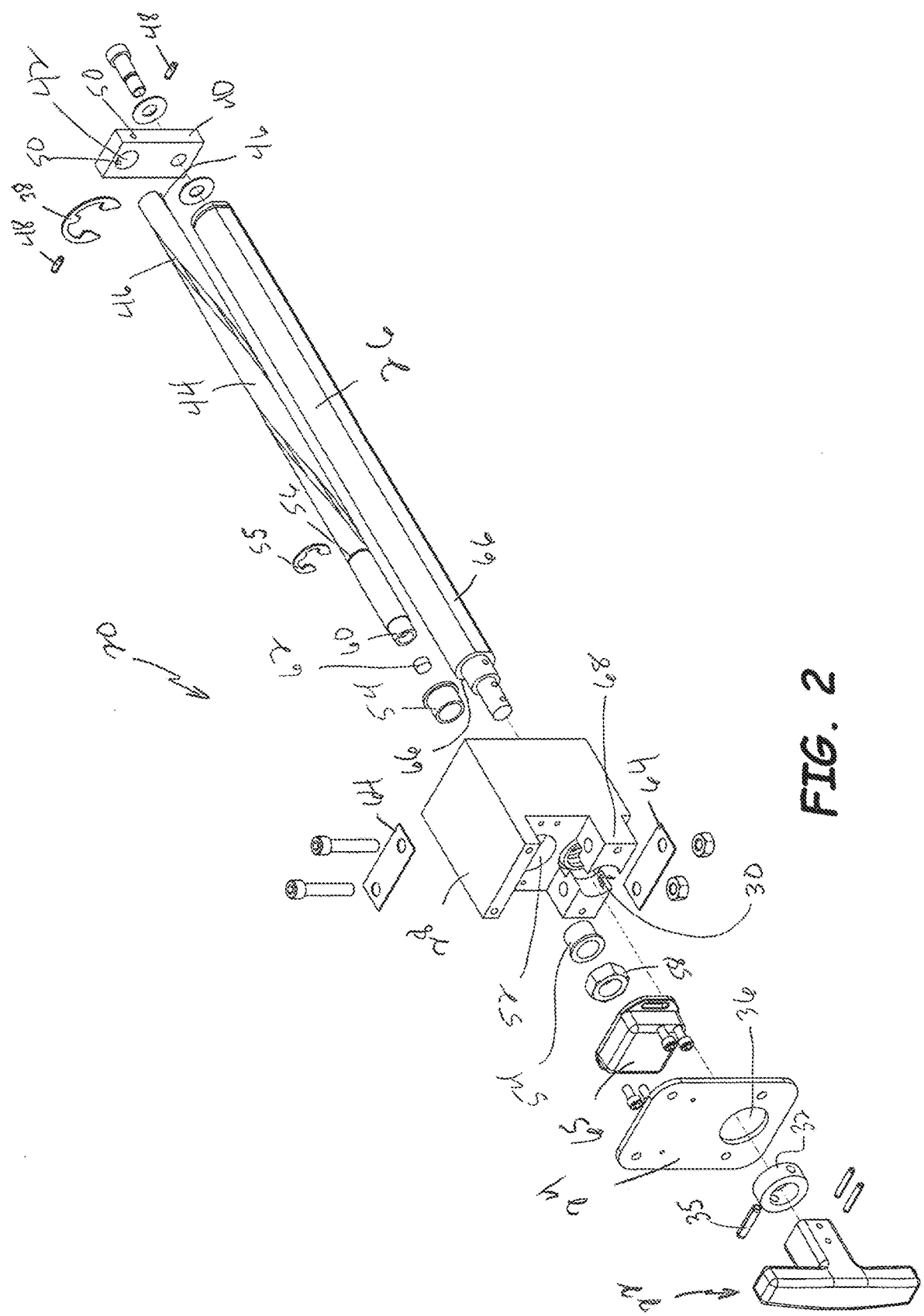

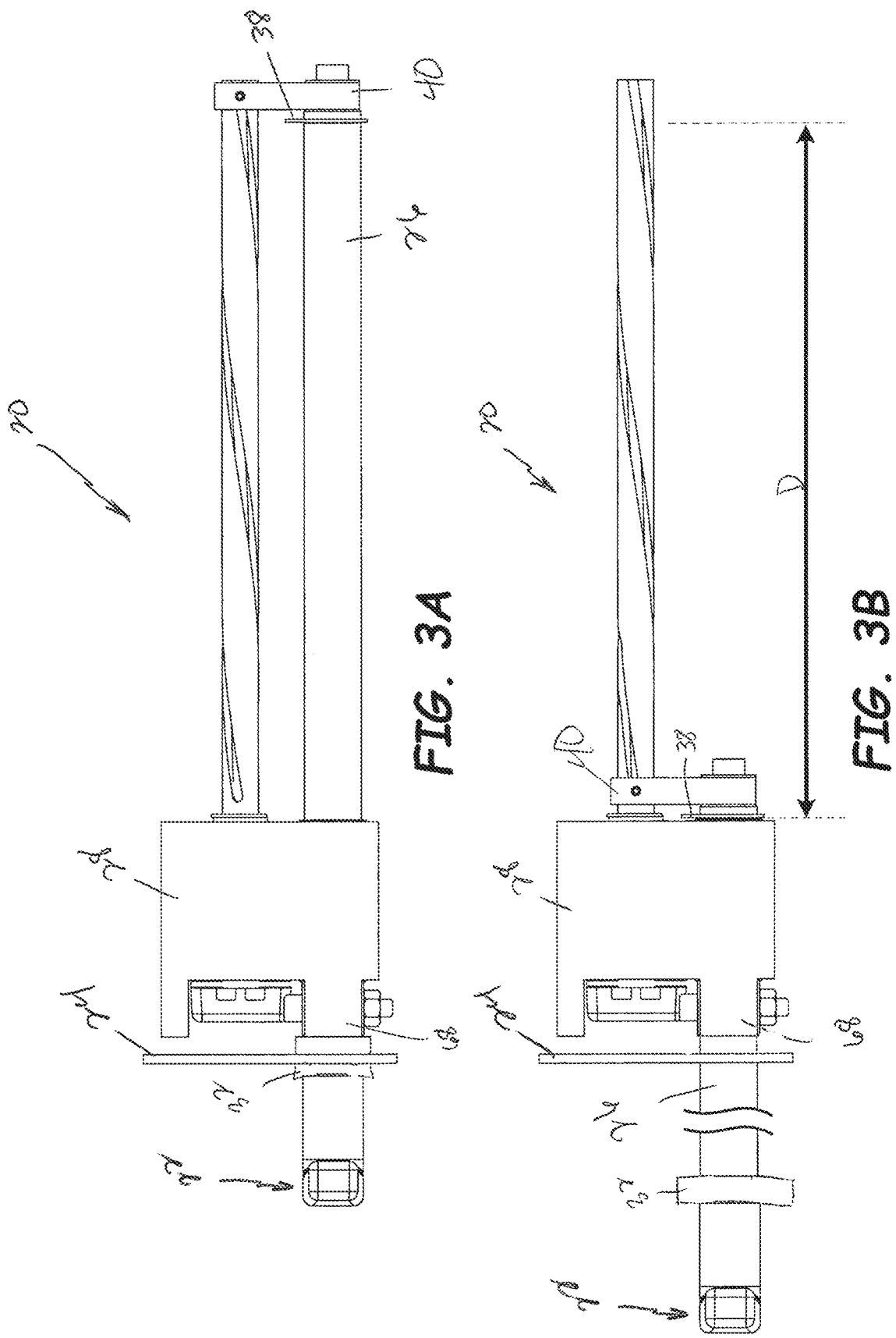

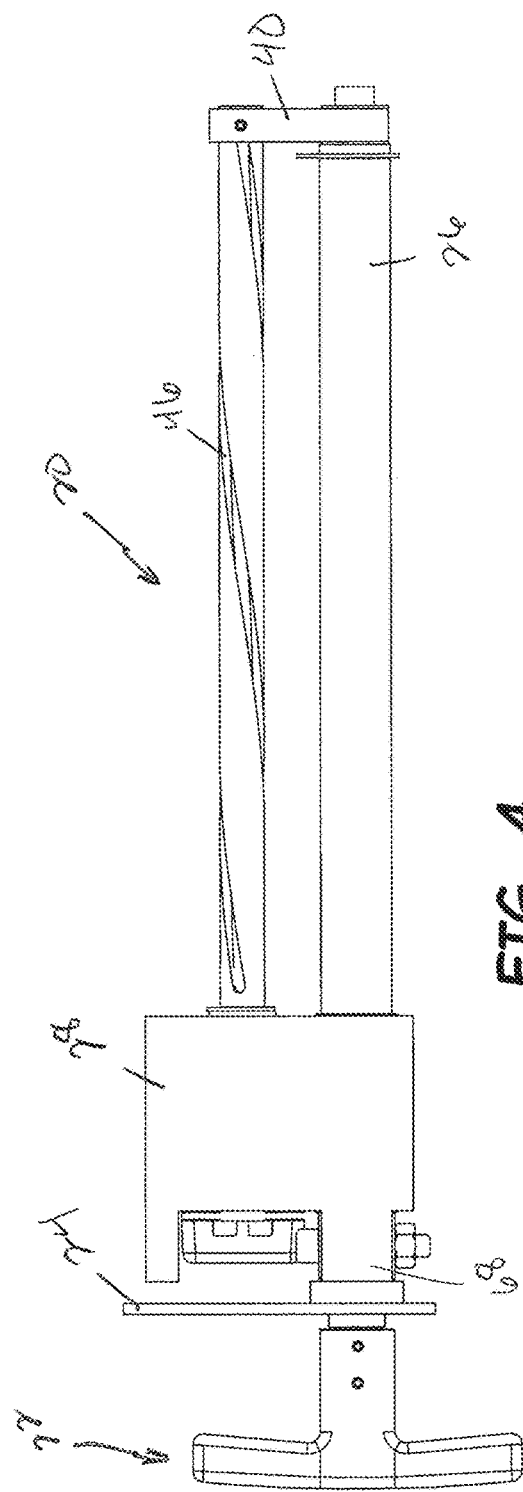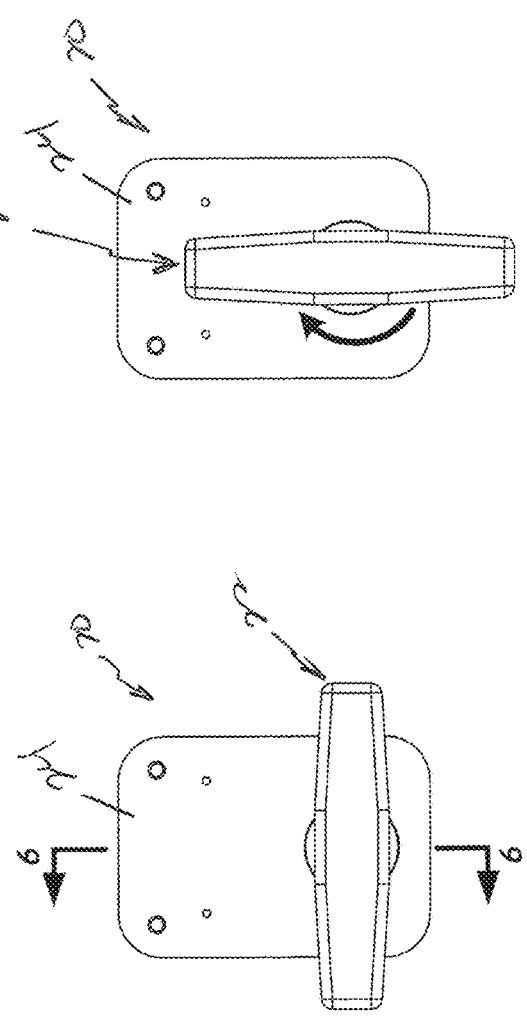

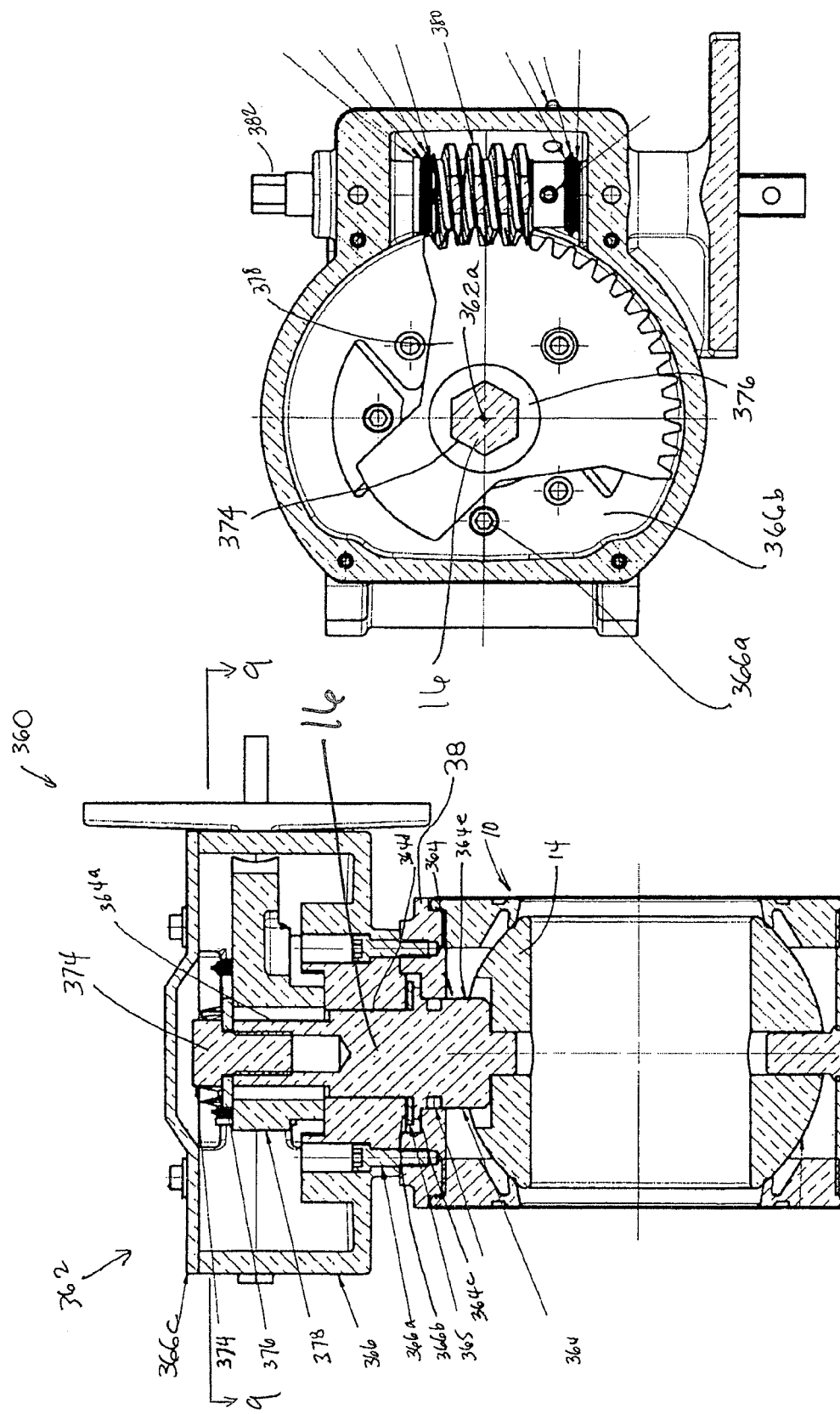

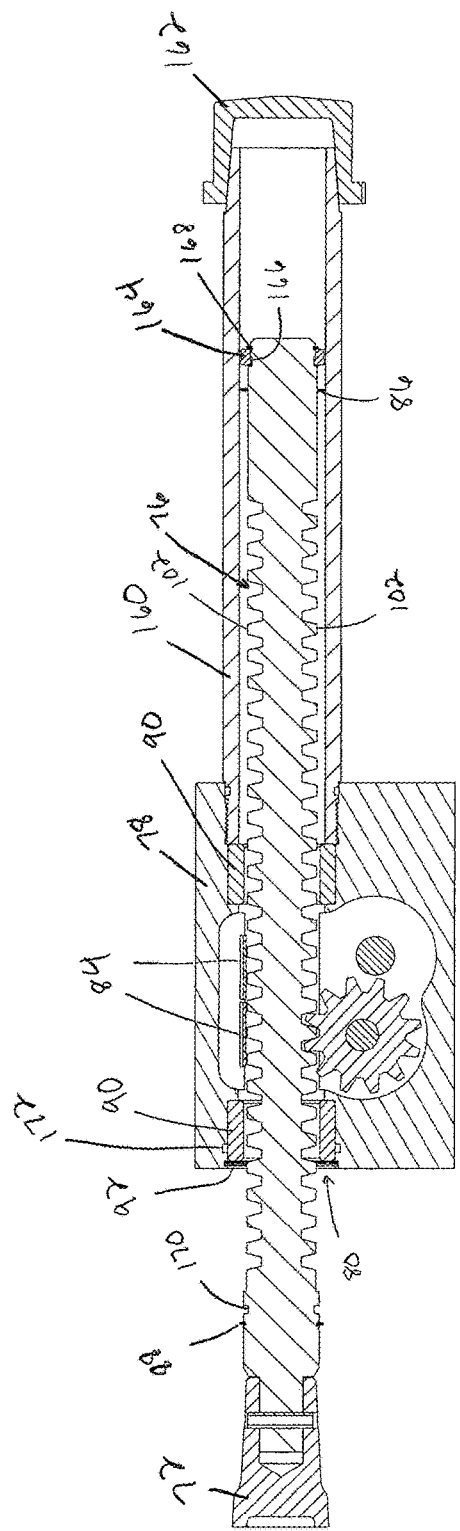

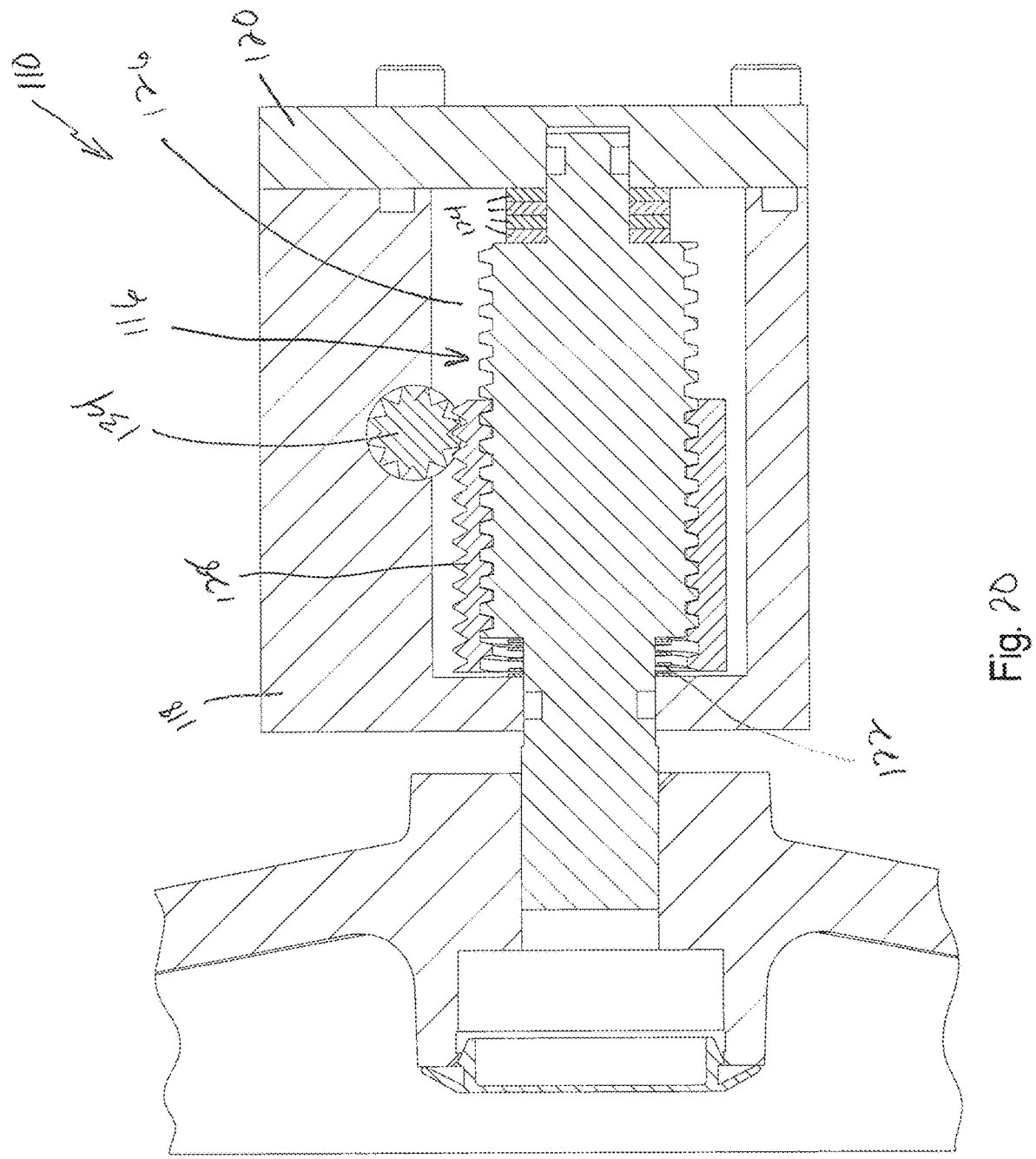

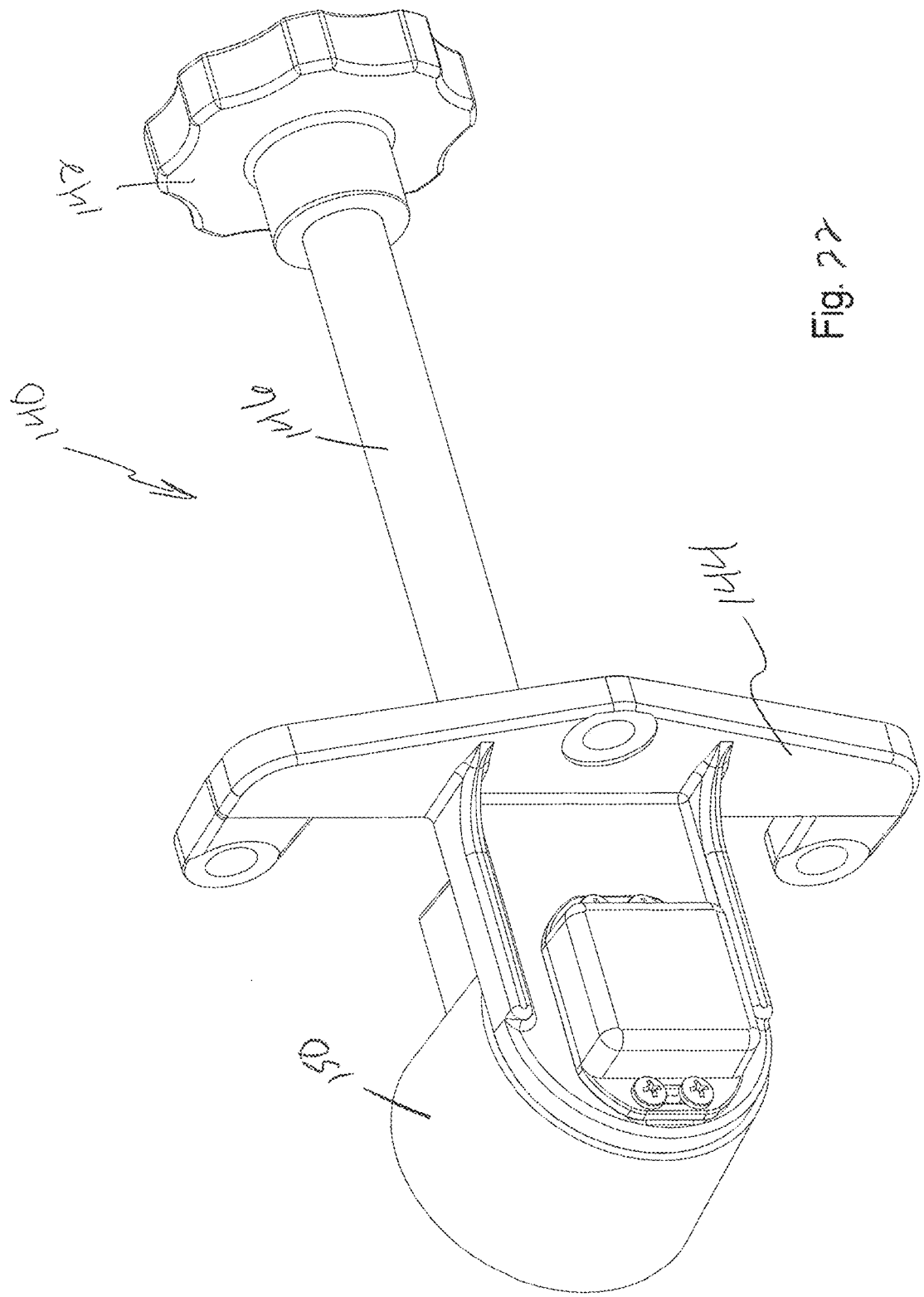

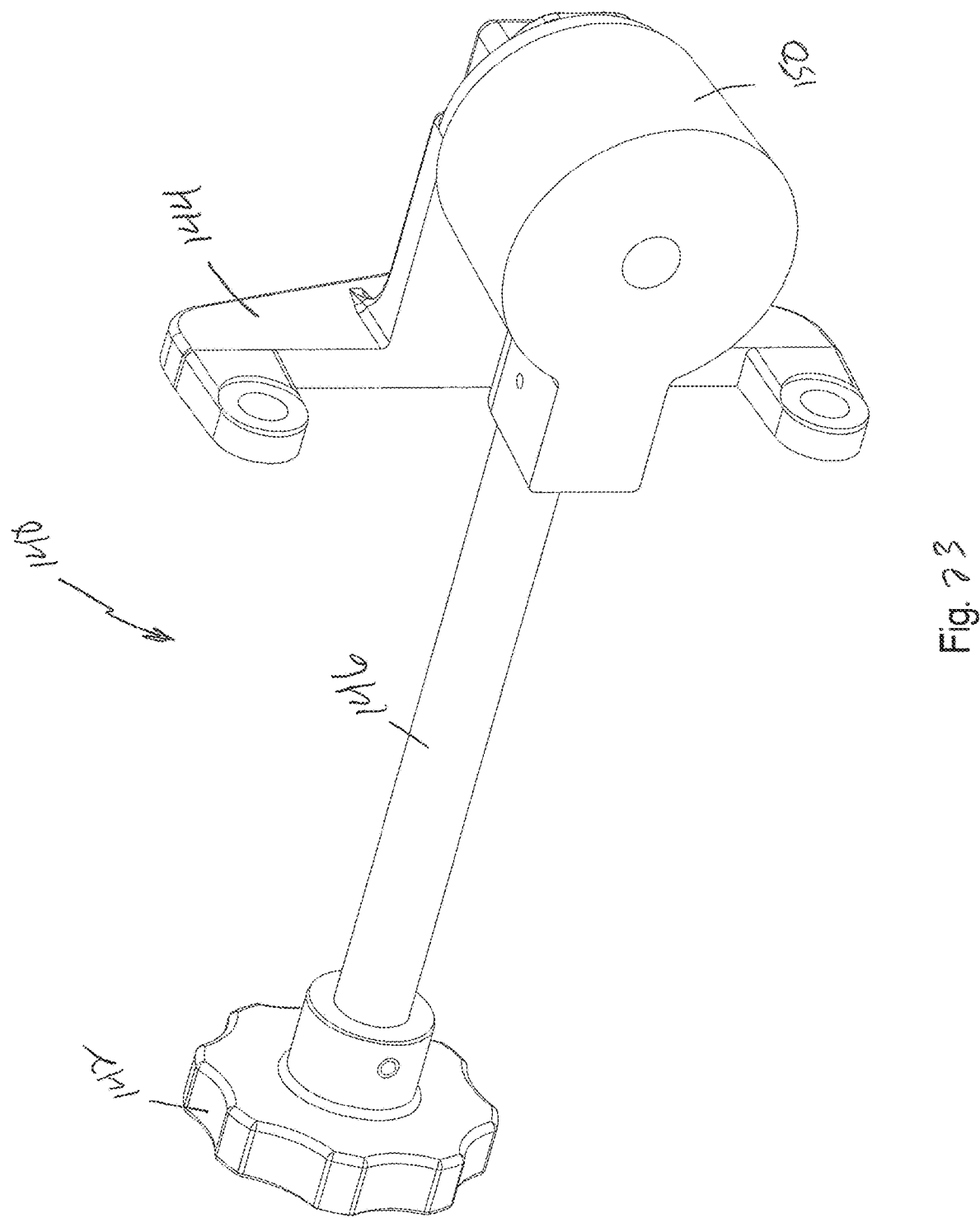

VALVE ACTUATOR

This application is a continuation of U.S. patent application Ser. No. 15/133,100, filed Apr. 19, 2016, which will issue on May 1, 2018 as U.S. Pat. No. 9,958,084, and claims the benefit under Title 35, U.S.C. § 119(e) of U.S. Provisional Patent Application Ser. No. 62/279,760, entitled VALVE ACTUATOR, filed on Jan. 16, 2016, and U.S. Provisional Patent Application Ser. No. 62/323,619, entitled VALVE ACTUATOR, filed on Apr. 15, 2016, the entire disclosures of which are expressly incorporated by reference herein.

The present disclosure relates to a valve actuator and, more particularly, to a combination mechanical/electrical valve actuator providing tactile feedback similar to a purely mechanical valve actuator.

BACKGROUND

Firefighters utilize pumper trucks to increase the pressure of water supplied by sources such as fire hydrants and to direct the pressurized water through fire hoses. Sources of water for pumper trucks can also include internal and external tanks as well as natural bodies of water. In certain circumstances, foam or other extinguishants may be used in combination with or in lieu of water.

A pumper truck includes a control panel controlling valves fluidly connected upstream and downstream from a pump used to pressurize the fluid extinguishant. These valves, which are utilized to control the flow of extinguishant to and from the pump, are controlled at the control panel by either purely mechanical or electrical valve actuators. A variety of valves useable with either electrical or mechanical actuators are disclosed in U.S. Pat. No. 7,516,941, the entire disclosure of which is hereby explicitly incorporated by reference herein.

Purely mechanical valve actuators can take a number of forms, but are defined by the transfer of force supplied by a user (a firefighter) to the valve body either directly or via a mechanism such as a mechanical linkage or a gear set. Mechanical actuators therefore rely on user supplied force to actuate the valve bodies. Examples of mechanical actuators include levers that are connected to a trunnion extending from a valve body for rotation therewith, and handwheels that can be rotated by a user to drive a worm gear meshed with a gear sector secured to the trunnion extending from the valve body. In mechanical embodiments utilizing a lever secured to the trunnion, a mechanical linkage may be interposed between the user interface (e.g., a T-handle) and the lever. The force supplied by the user may be amplified by the mechanism employed to transfer the user input force to the valve body, but mechanical valve actuators remain very difficult to actuate in certain circumstances, such as when fluid is flowing through the conduit in which the valve body is positioned.

Contrary to mechanical actuators in which the actuation force is supplied by the user, electrical valve actuators utilize motive force supplied by a motor which is triggered to actuate the valve by a signal stemming from a user input such as a push button. With electrical valve actuators, the force utilized to move the valve body between the open and closed positions is supplied solely by the motor, with the user not supplying any of the force utilized to move the valve body. The electric motor may be used to turn a shaft bearing a worm gear that is meshed with a gear sector secured to the trunnion extending from the valve body.

While electrical actuators provide a number of advantages, including ease of use and easily repeatable re-positing; firefighters tend to prefer the tactile feedback provided by a mechanical actuator. The push buttons used to activate electrical actuators can also be quite difficult to actuate with a hand encumbered by the bulky gloves worn by firefighters for protection. Electrical actuators, such and the UBEC and EXM controllers available from Elkhart Brass Company, Inc. of Elkhart, Ind., utilize a number of push buttons to trigger signals to a motor arranged for driving the valve body. These buttons do not provide the tactile feedback of the purely mechanical actuators and can be difficult to operate with a gloved hand.

SUMMARY

A combination mechanical/electrical valve actuator providing the ease of use with a gloved hand and tactile feedback of a purely mechanical actuator together with the advantages associated with an electrical actuator is disclosed.

BRIEF DESCRIPTION OF THE DRAWINGS

FIG. 1 is a perspective view of a first embodiment combination mechanical/electrical valve actuator in accordance with the present disclosure;

FIG. 2 is an exploded, perspective view of the actuator illustrated in FIG. 1;

FIG. 3A is a right, elevational view illustrating the actuator of FIGS. 1 and 2 in a "closed" position;

FIG. 3B is a right side, elevational view of the actuator of FIGS. 1 and 2, illustrated in the "open" position;

FIG. 4 is a right side, elevational view illustrating the actuator of FIGS. 1 and 2 with the T-handle thereof rotated into a locked position;

FIG. 5A is a front, elevational view illustrating the T-handle of the actuator of FIGS. 1 and 2 rotated into an actuation position;

FIG. 5B is a front, elevational view illustrating the T-handle of the actuator of FIGS. 1 and 2 rotated into a locked position;

FIG. 8 is a sectional view of the valve assembly of FIG. 7 taken along line 8-8 of FIG. 7;

FIG. 9 is a sectional view of the valve assembly of FIGS. 7 and 8 taken along line 9-9 of FIG. 8;

FIG. 12 is an exploded, perspective view of the actuator illustrated in FIG. 10;

FIG. 13 is a sectional view taken along the longitudinal axis of rack 76 of the actuator illustrated in FIG. 10 and illustrating the actuator in an unlocked position;

FIG. 18 is a further perspective view of the actuator of FIG. 16;

FIG. 19 is an exploded, perspective view of the actuator of FIG. 16;

FIG. 20 is a sectional view taken in a plane containing the longitudinal axis of the worm gear of the mechanical actuator of FIG. 16 and perpendicular to the longitudinal axis of the magnet gear of the actuator of FIG. 16;

FIG. 23 is a further perspective view of the actuator of FIG. 22;

FIG. 26 is a sectional view taken along a section plane containing the longitudinal axis of the lever of the actuator of the embodiment illustrated in FIG. 22 and orthogonal to the sectional view of FIG. 25;

Figure 6:
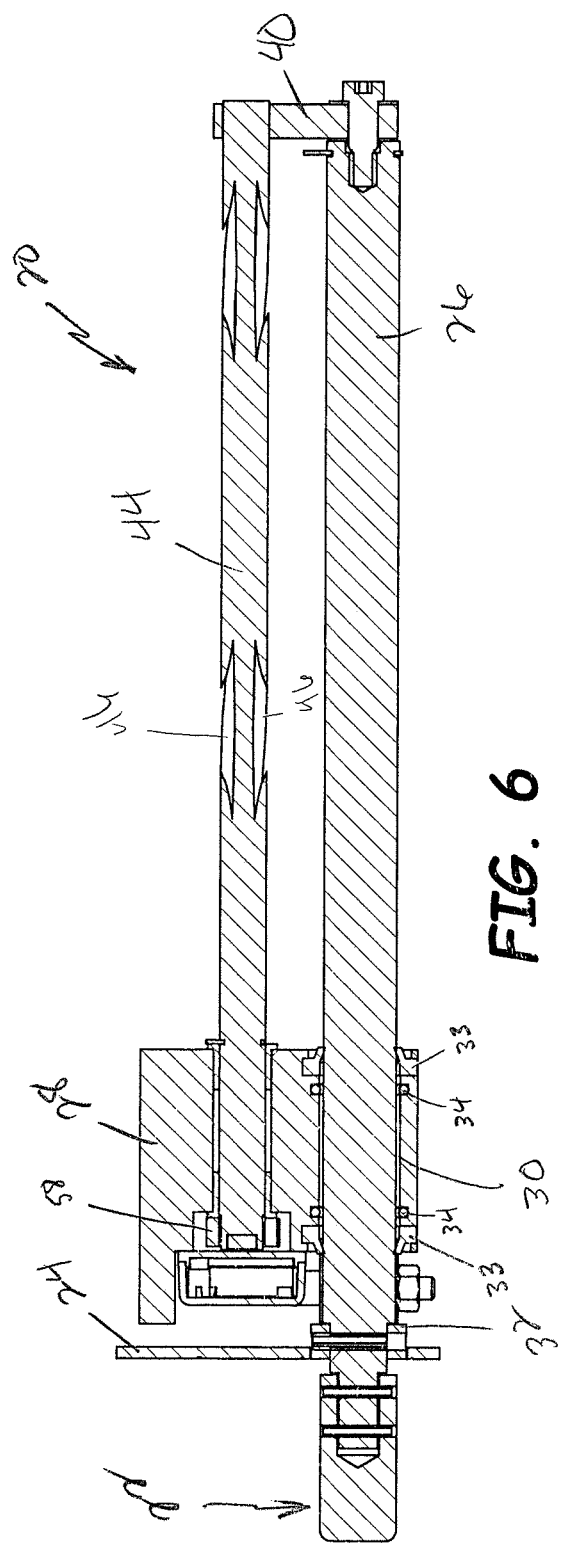
FIG. 6 is a sectional view taken along line 6-6 of FIG. 5A.

Corresponding reference characters indicate corresponding parts throughout the several views. Although the drawings represent embodiments of the present invention, the drawings are not necessarily to scale and certain features may be exaggerated in order to better illustrate and explain the invention. The exemplification set out herein illustrate embodiments of the invention and such exemplifications are not to be construed as limiting the scope of the invention in any manner.

DETAILED DESCRIPTION

The embodiments disclosed below are not intended to be exhaustive or to limit the invention to the precise forms disclosed in the following detailed description. Rather, the embodiments are chosen and described so that others skilled in the art may utilize their teachings.

Referring to FIGS. 1-6, actuator 20 includes T-handle 22 sized and arranged to allow a firefighter to grasp the same and pull a portion of the actuator to linearly displace the same from the control panel of a fire truck. Actuator 20 resembles a purely mechanical actuator such as the RC-1 available from Elkhart Brass Company, Inc. of Elkhart, Ind., which couples a linearly displaceable T-handle with a mechanical linkage terminating in a lever perpendicularly depending from the trunnion of a valve such as a ball valve. Throughout this document a number of interface means for providing a control interface having the look and feel of a purely mechanical valve actuator are provided. These interface means are characterized by a travel distance (linear or rotational) and/or force to operate that approaches the travel distance and/or the force to operate that is required for purely mechanical valve actuators such as purely mechanical valve actuators utilizing multi-bar mechanisms, handwheel and gear sector combinations and the like. For example, the interface means (actuators) described in this document may be characterized by travel distance and/or force to operate that is at least about 40% of the travel distance and/or force to operate of a purely mechanical actuator. Particular exemplary travel distances and forces to operate providing the look and feel of a purely mechanical actuator to the interference means (actuators) of the present disclosure are provided throughout this document.

T-handle 22 is moveable from a closed position, as illustrated in FIGS. 1, 3A, 4 and 6 to an open position, as illustrated in FIG. 3B. In the closed position, actuator 20 is positioned to actuate an associated valve body, such as valve body 14 (FIGS. 7&8) to a closed position, as further described below. In the open position, actuator 20 is positioned to actuate an associated valve body to an open position, as further described below. A mechanical actuator travel distance is defined between the closed position and the open position. The mechanical actuator has a resistance to movement over this travel distance that must be overcome to move the mechanical actuator between the closed position and the open position. In an exemplification of this embodiment, the resistance to movement is about 10 to 15 pounds force (lbf). Moving actuator 20 from an at rest position will require overcoming static friction, while continuing to move an already moving actuator 20 will only require overcoming sliding friction. In an exemplification of this embodiment, the force required to begin movement of actuator 20 from rest is about 15 lbf, while the force required to maintain movement is about 12 lbf. To the extent that this document discusses a "resistance to movement" over the mechanical actuator travel distance, this "resistance to movement" is equal to the force required to begin movement of the actuator from rest.

Actuator 20 includes face plate 24 that can be secured to a control panel of a fire truck such that T-handle 22 is exposed from the control panel for access by a firefighter, with the structure of actuator 20 on the opposite side of face plate 24 from T-handle 22 in FIG. 1 is hidden behind the control panel. From the position of T-handle 22 illustrated in FIGS. 1, 3A and 6, T-handle 22 can be grasped by the gloved hand of a firefighter and pulled away from face plate 24 to the position illustrated in FIG. 3B. To effect such a movement between the opposed end points of travel of T-handle 22 and the associated pull rod 26 (described in greater detail below), these structures are pulled over a mechanical actuator travel distance D shown in FIG. 3B. This mechanical actuator travel distance is the distance travelled by the mechanical actuator from one end point of travel to the opposite end point of travel. In the exemplification of FIGS. 1-6, the mechanical actuator travel distance is about 7.5 inches. This extent of travel is associated with the connected valve body maintaining the closed position at one extreme and maintaining the open position at the other extreme.

Figure 7:
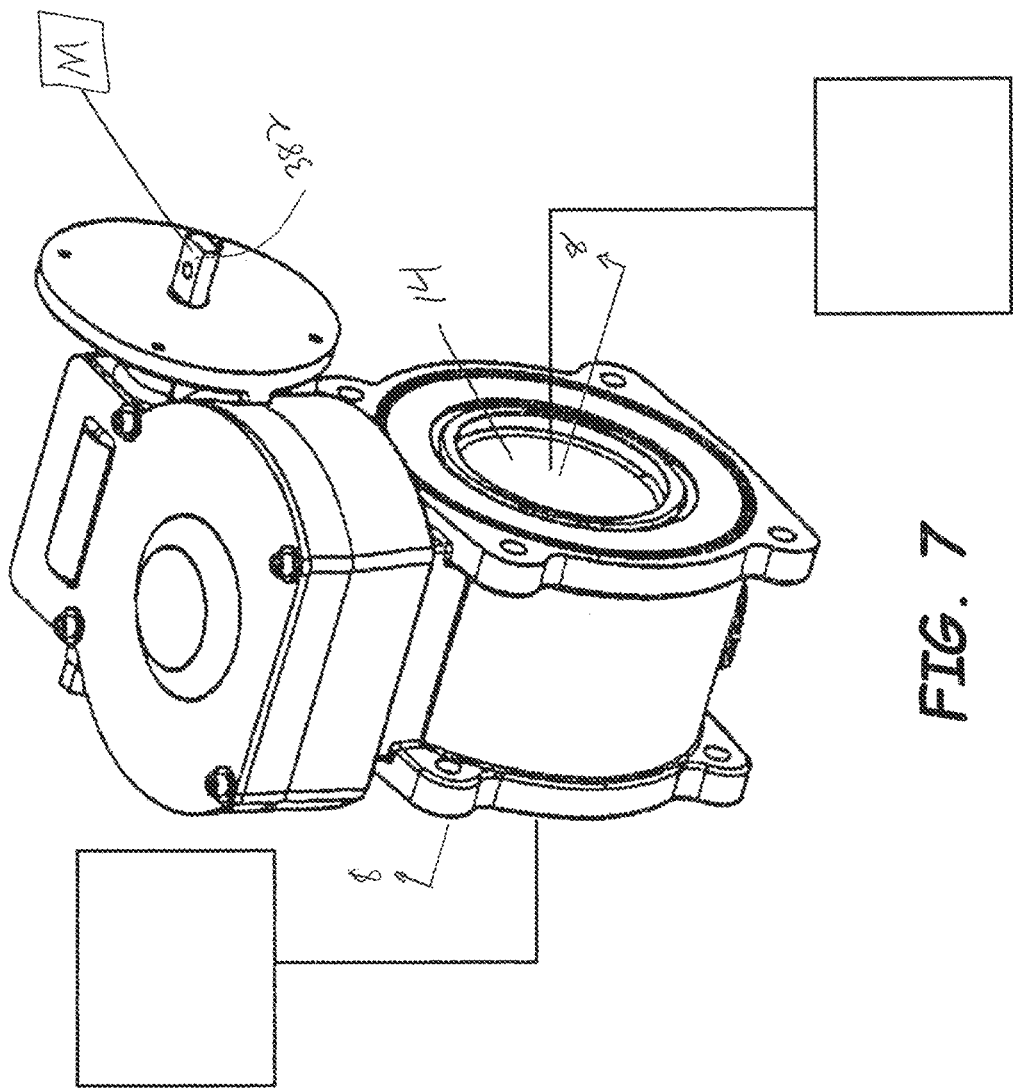
FIG. 7 is a perspective, schematic view illustrating a valve assembly usable with the combination mechanical/electrical valve actuators of the present disclosure.
Figure 10:
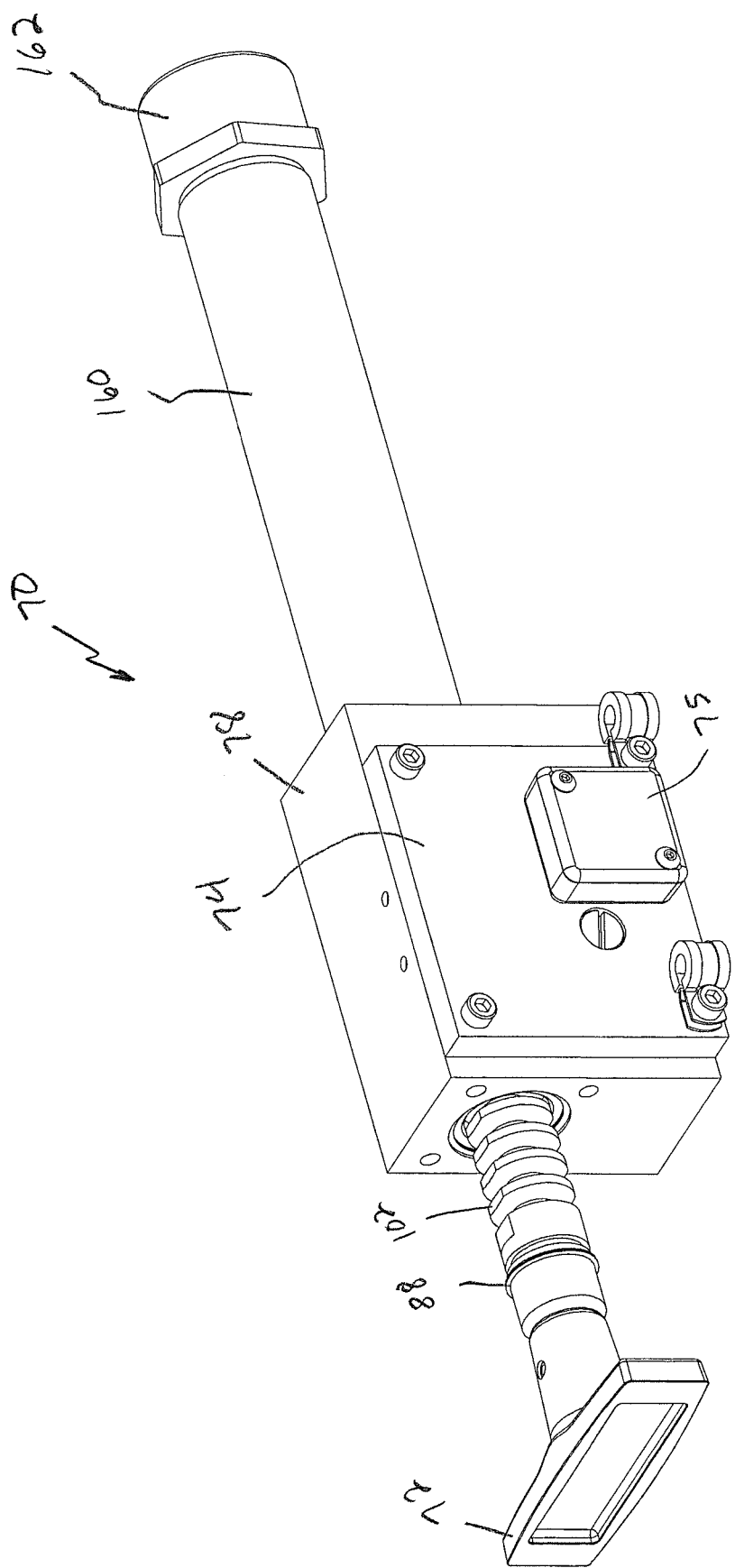
FIG. 10 is a perspective view of a second embodiment combination mechanical/electrical valve actuator in accordance with the present disclosure.
Figure 11:
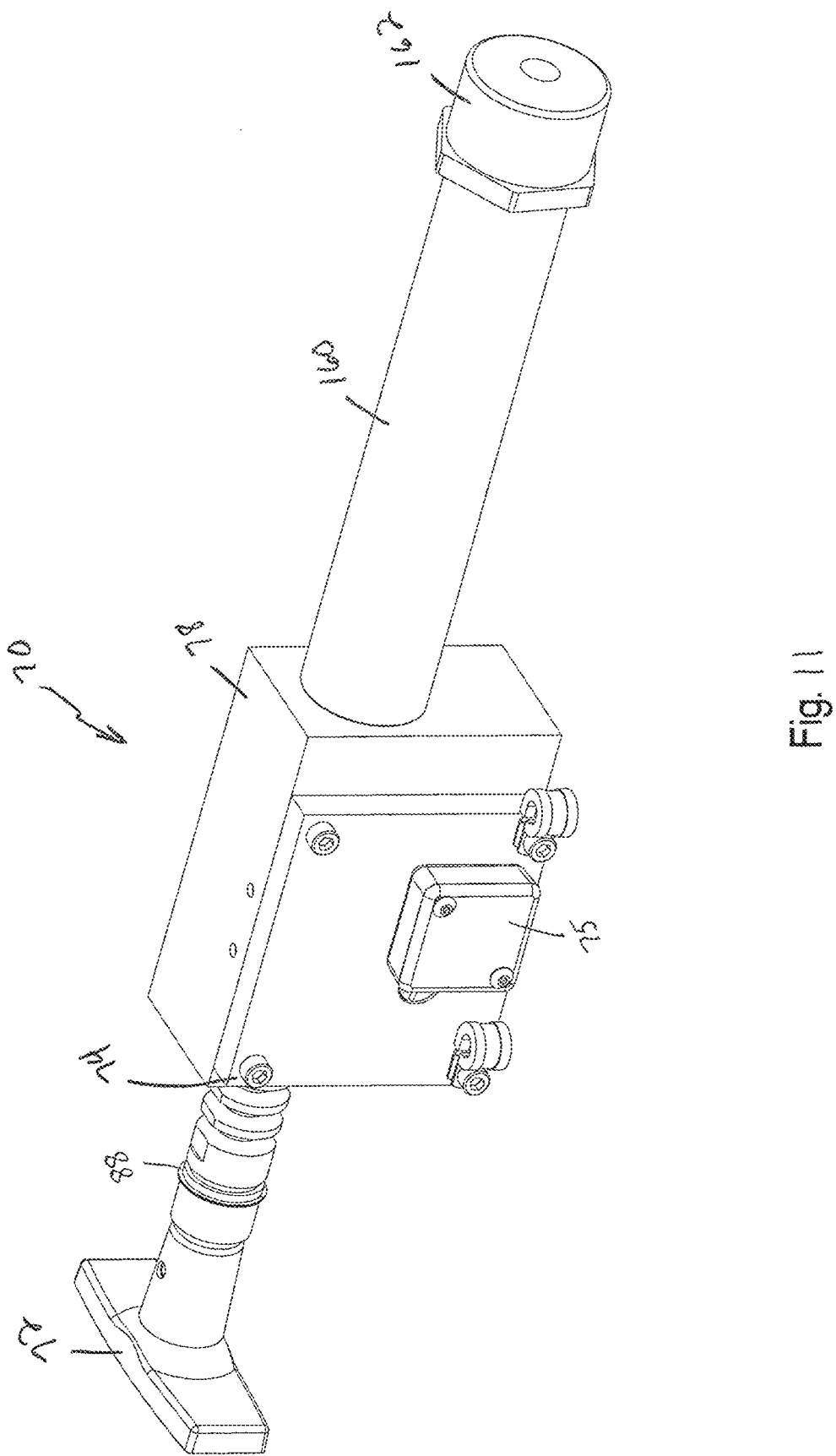
FIG. 11 is another perspective view of the actuator illustrated in FIG. 10.
Figure 17:
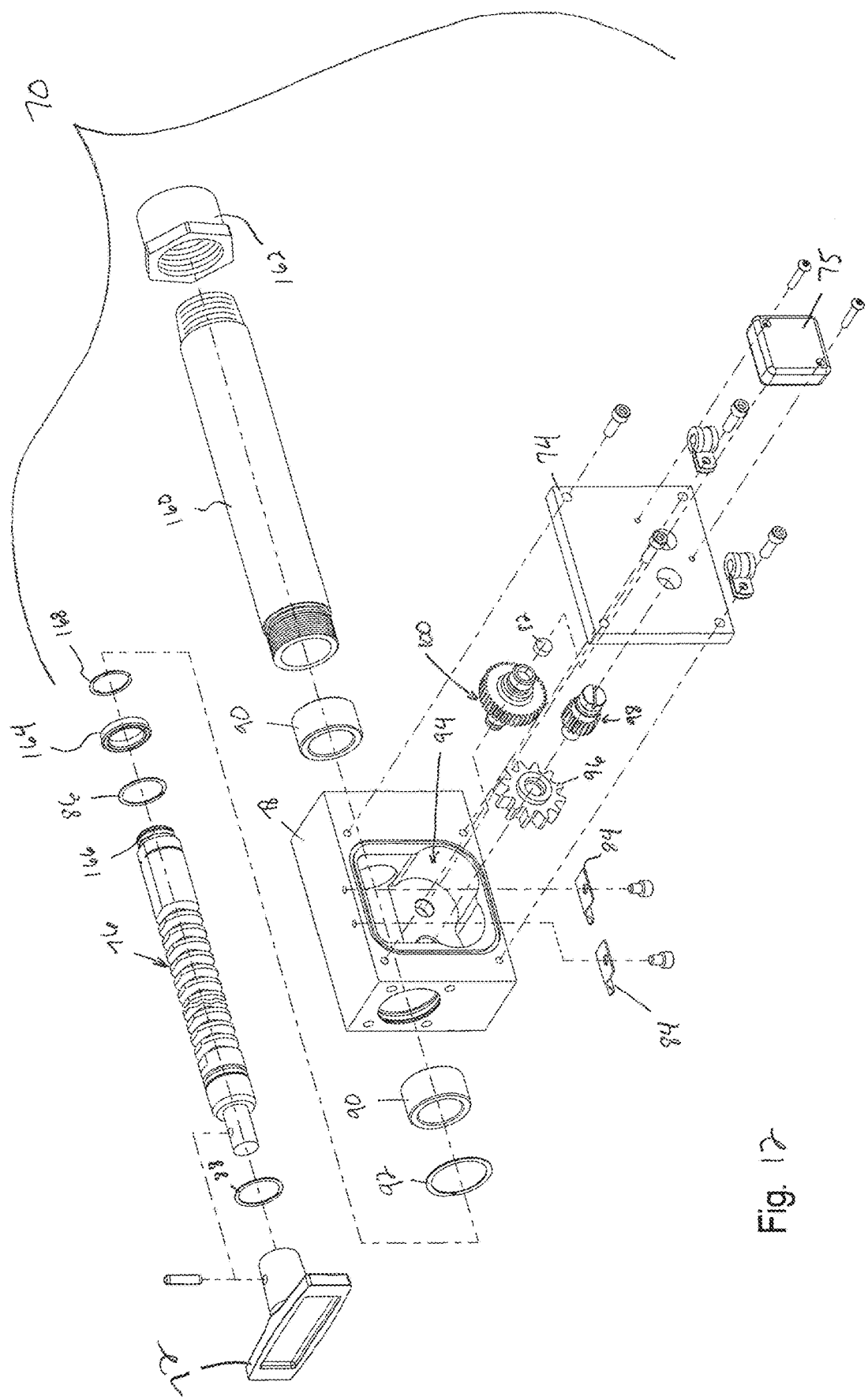
FIG. 17 is a second perspective view of the actuator illustrated in FIG. 16.
Figure 15:
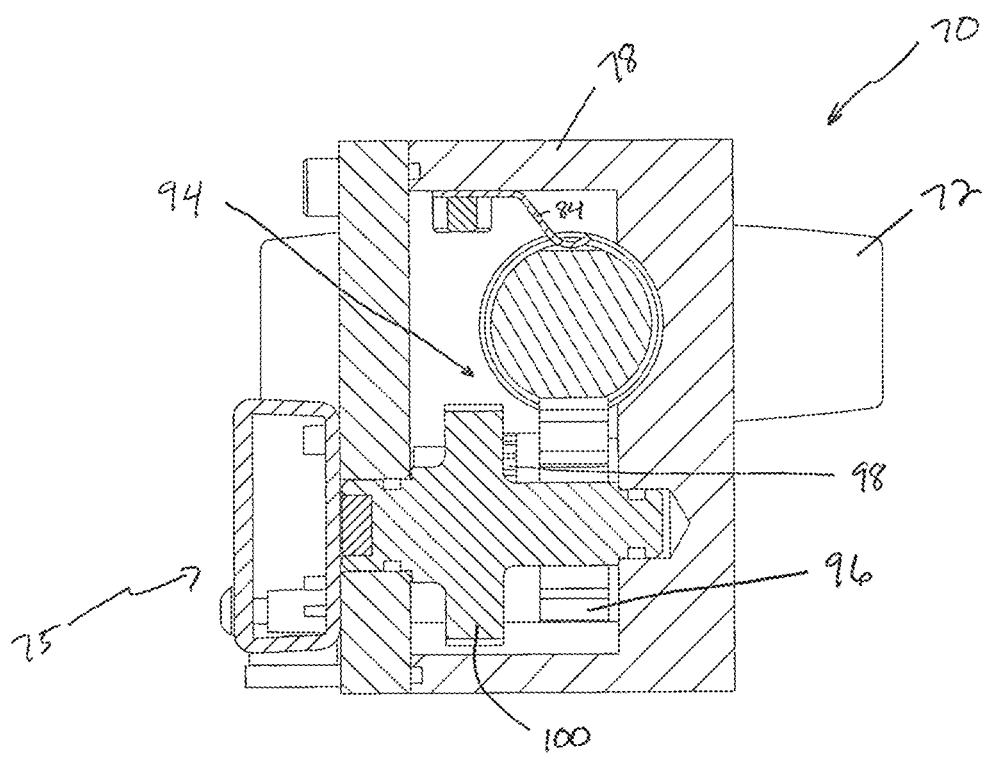
FIG. 15 is a sectional view perpendicular to the longitudinal axis of the rack of the actuator of FIG. 10 and taken in a plane containing the longitudinal axis of the second gear of the gear reduction.
Figure 16:
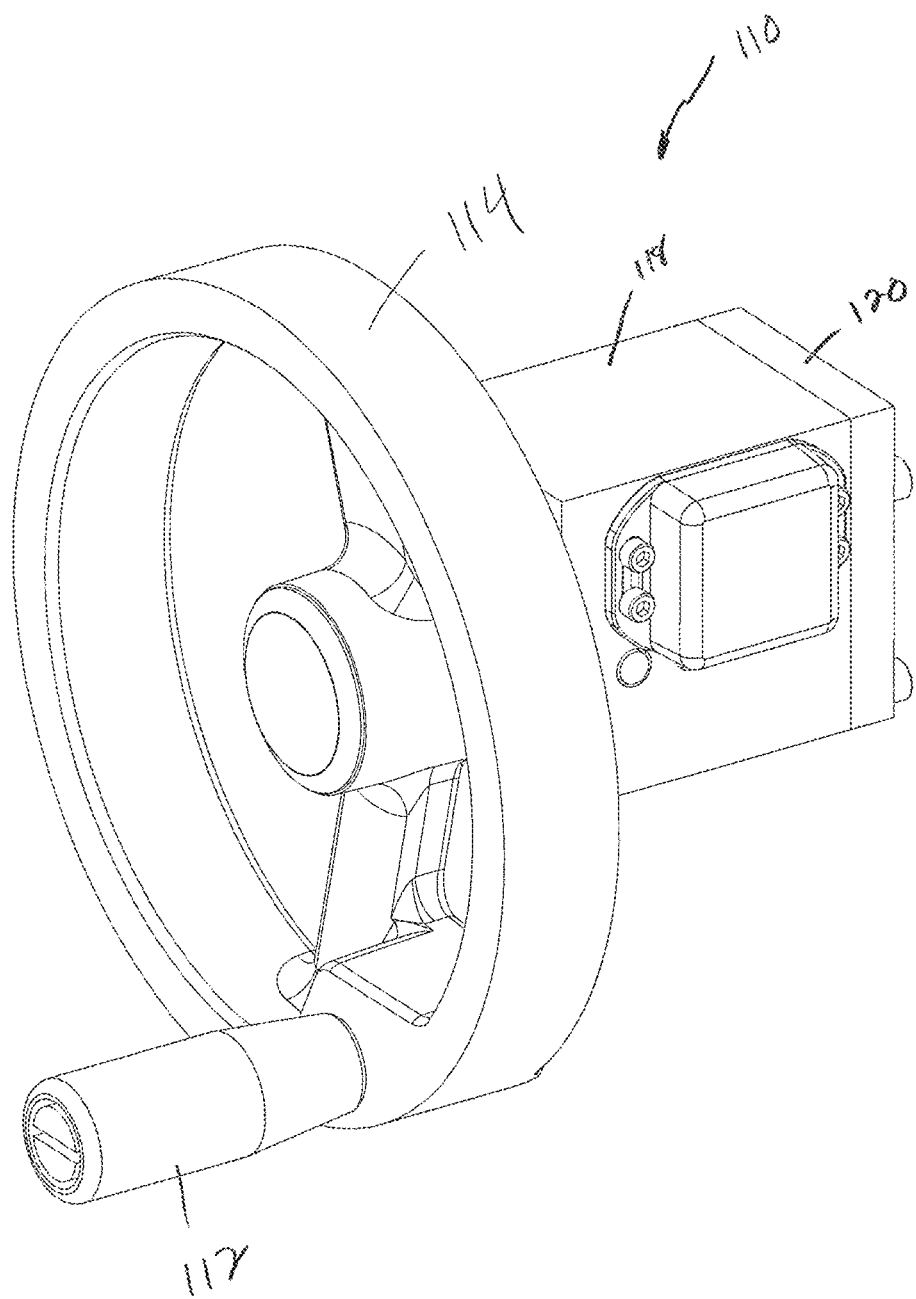
FIG. 16 is a perspective view of a third embodiment combination mechanical/electrical valve actuator in accordance with the present disclosure.
Figure 17:
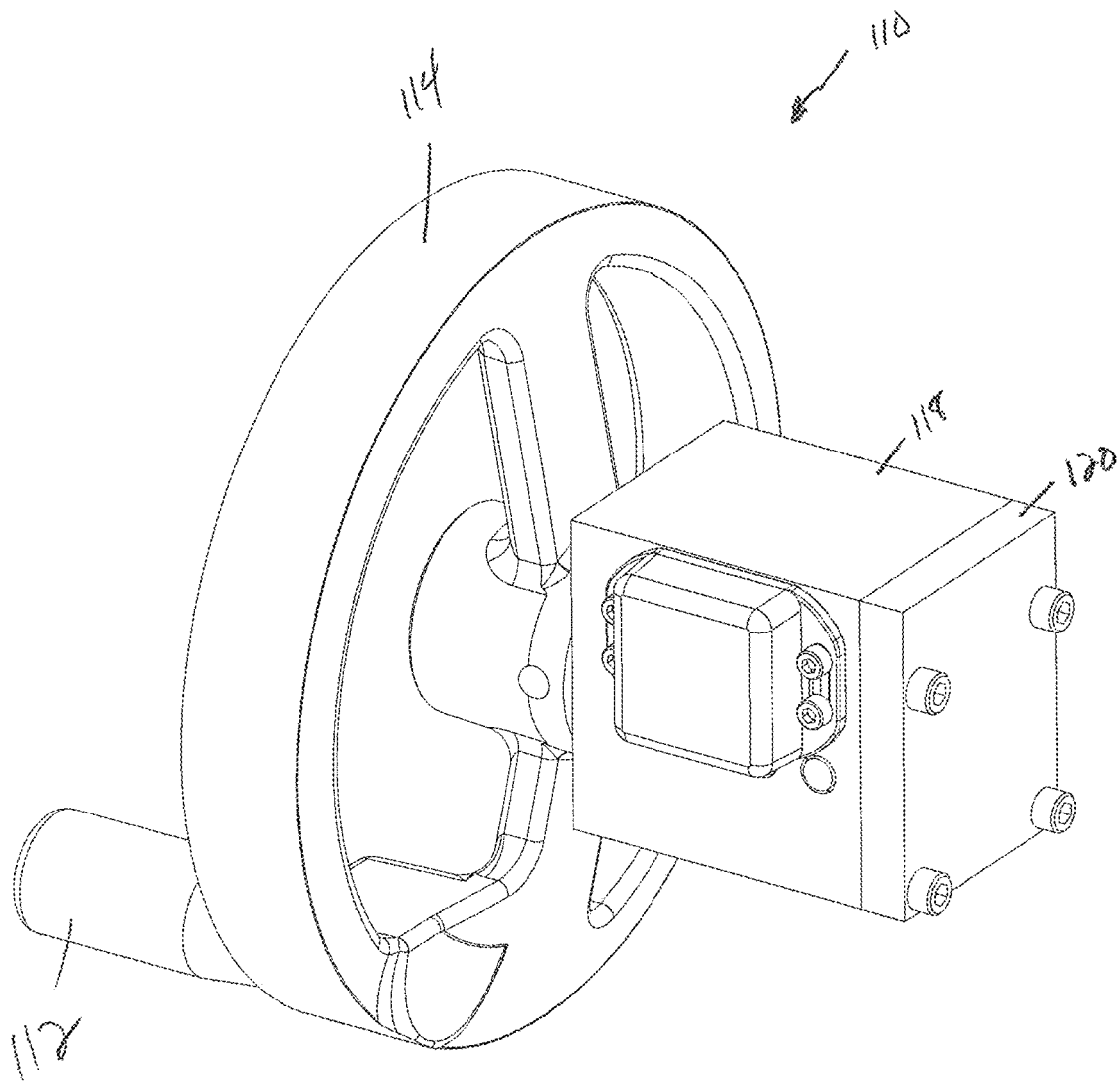
Figure 14:
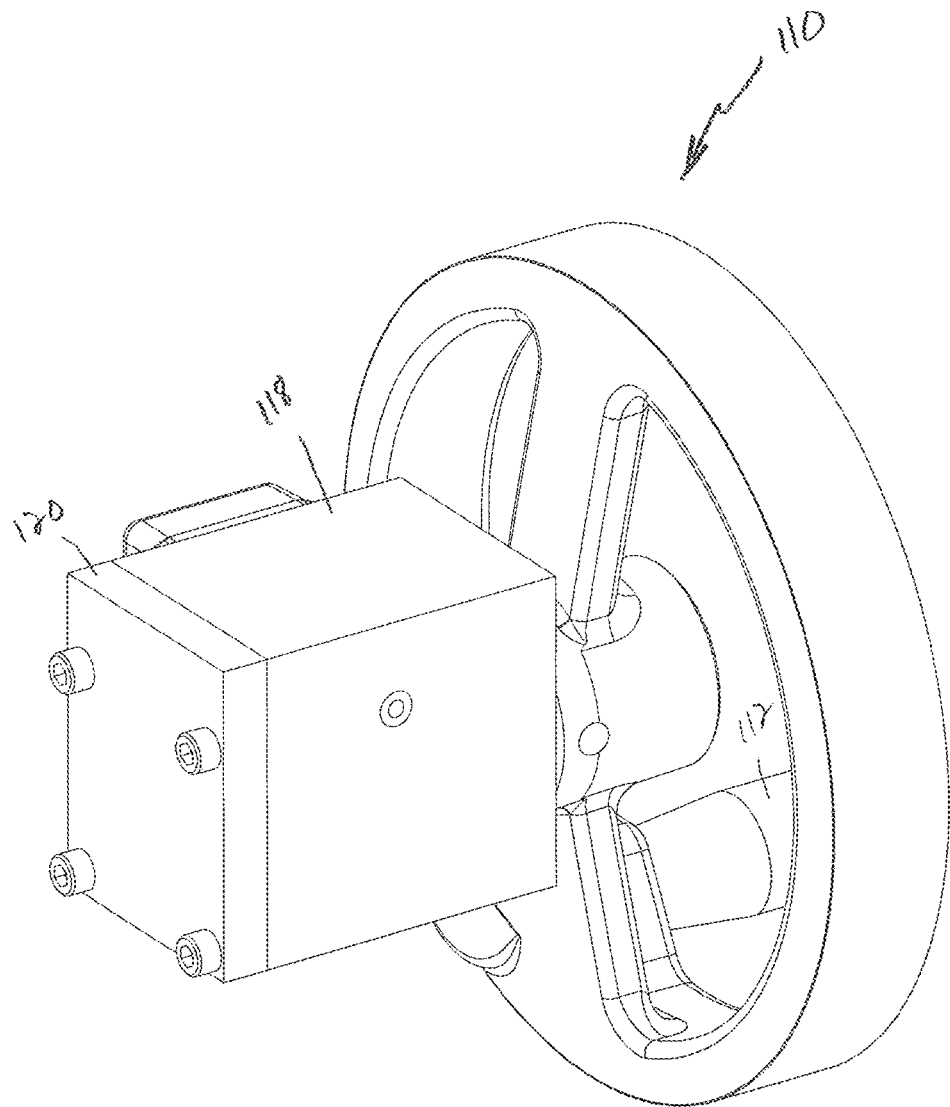
FIG. 14 is a sectional view taken along the longitudinal axis of rack 76 of the actuator illustrated in FIG. 10 and illustrating the actuator in a locked position.
Figure 17:
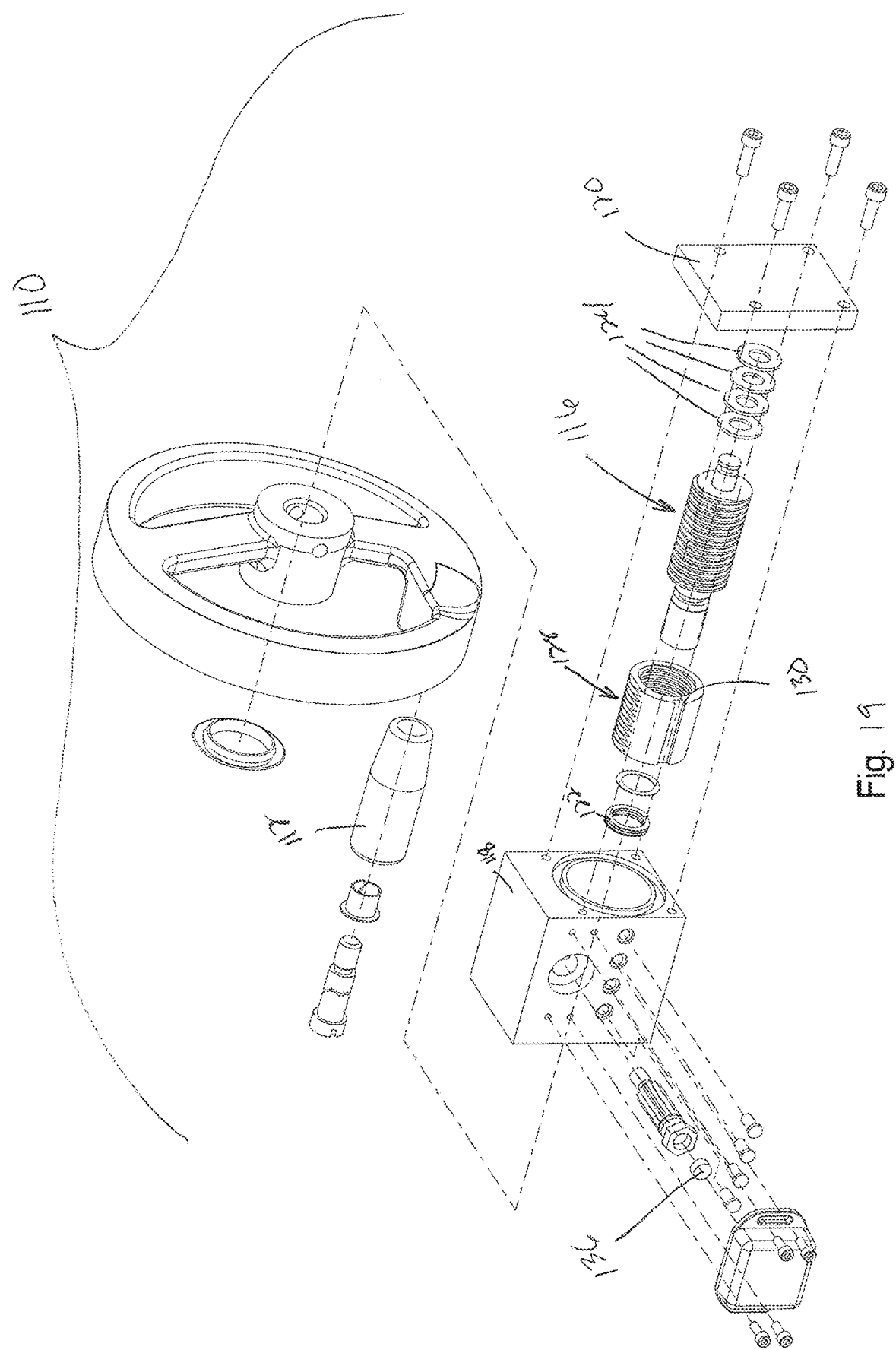
Figure 21:
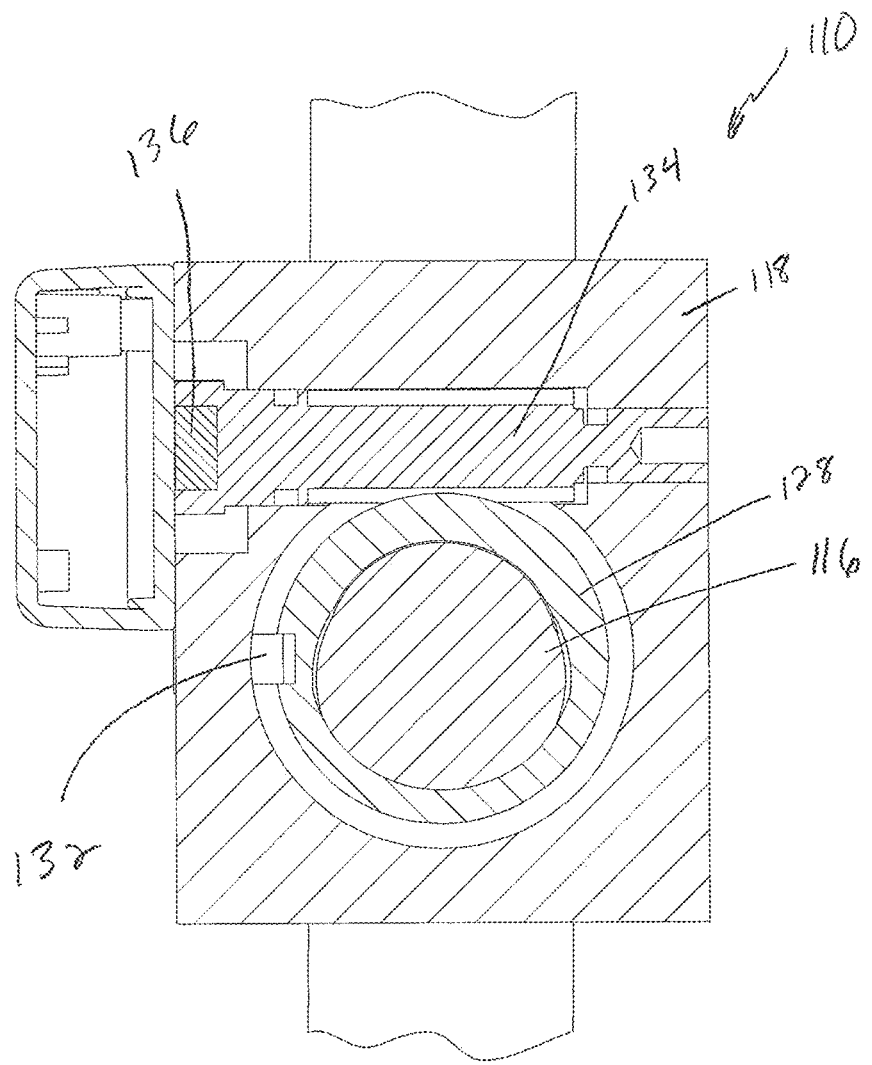
FIG. 21 is another sectional view of the actuator of FIG. 16 orthogonal to the sectional view of FIG. 20 and taken in a plane containing the longitudinal axis of the magnet gear thereof.
Figure 24:
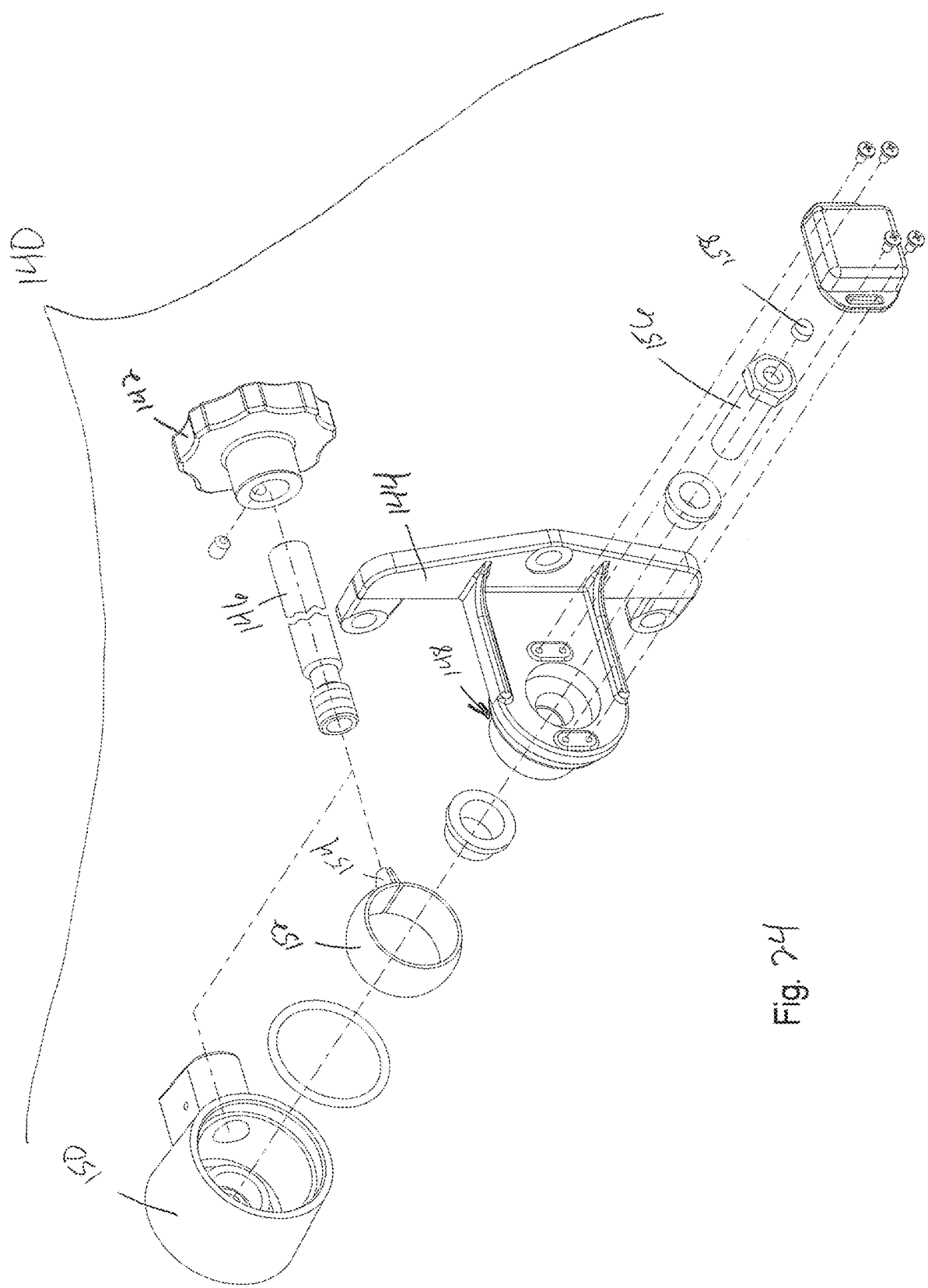
FIG. 24 is an exploded, perspective view of the actuator of FIG. 22.

Pull rod 26 is supported for the linear movement described above by support block 28. With actuator 20 operably associated with a firetruck, support block 28 will be fixed relative to the firetruck to support actuator 20 relative to the firetruck. Referring to FIGS. 2 and 6, pull rod 26 is positioned through lower aperture 30 of support block 28, with bearings 33, 34 interposed therebetween (FIG. 6). Bearings 33, 34 may take the form of wiper seals and O-rings, respectively. With pull rod 26 positioned through lower aperture 30 of support block 28, collar 32 is secured to a proximal end of pull rod 26 with pin 35 traversing transverse apertures in collar 32 and pull rod 26 to secure collar 32 to pull rod 26. Collar 32 has an outside diameter sized to traverse aperture 36 in face plate 24, but is too large to fit into lower aperture 30 of support block 28. In this way, collar 32 serves as a physical barrier or "stop" at one end point of travel distance D. At the opposite end of pull rod 26, snap ring 38 is positioned in an annular groove in pull rod 26 and secured thereto. Snap ring 38 presents a shoulder extending radially outward from pull rod 26 such that snap ring 38 serves as a physical barrier or "stop" at the other end point of travel distance D, as illustrated in FIG. 3B. To actuate T-handle 22 and pull rod 26 from the position illustrated in FIG. 3A to the position illustrated in FIG. 3B, T-handle 22 may be grasped by the gloved hand of a firefighter and pulled a distance equal to distance D illustrated in FIG. 3B, which is the mechanical actuator travel distance.

Actuator 20 includes a mechanism for locking the position of pull rod 26 relative to support block 28. Leaf springs 64 are secured to support block 28 and intersect lower aperture 30 of support block 28. Pull rod 26 includes corresponding flats 66. When pull rod 26 is rotated to the position illustrated in FIGS. 1, 3A, 3B, 5A and 6, flats 66 are aligned with leaf springs 64 and pull rod 26 can be pulled from support block 28 with the application of the force described above. In this position, pull rod 26 may be spaced from support block 28 and leaf springs 64 such that pull rod 26 is freely, linearly displaceable relative to support block 28. If some resistance is desired in this position to produce the desired resistance to movement, then leaf springs may apply a small normal force to pull rod 26 in this position. Pull rod 26 may be rotated from the above described position to the position illustrated in FIG. 5B to lock pull rod 26 relative to support block 28. In the position illustrated in FIG. 5B, flats 66 are no longer aligned with leaf springs 64. In this position, an arcuate perimeter of pull rod 26 extends upwardly and downwardly from extension 68 of support block 28 (FIG. 2) such that this rounded exterior presses outwardly (upwardly and downwardly in the exemplification illustrated) against leaf springs 64 (which are bolted to extension 68) to create an interference fit such that application of force in the amount of the above described resistance to movement will not linearly actuate pull rod 26. In the locked position illustrated in FIG. 5B, a typical firefighter will not be able to grasp T-handle 22 and linearly actuate pull rod 26 without, at a minimum, some manner of significant mechanical advantage.

Distal of snap ring 38, yoke block 40 is bolted to pull rod 26 for movement therewith. A lag bolt is utilized so that pull rod 26 is rotatable relative to yoke block 40 between the locked and unlocked positions. Yoke block 40 includes upper aperture 42 in which rotating rod 44 is positioned. Upper aperture 42 has a larger diameter than the outer diameter of rotating rod 44 so that rotating rod 44 is rotatable with respect to yoke block 40 when rotating rod 44 occupies upper aperture 42 of yoke block 40, as illustrated, e.g., in FIG. 6. Rotating rod 44 includes a pair of helical grooves 46 separated by 180 degrees about the circular perimeter of rotating rod 44. With rotating rod 44 rotatably positioned in upper aperture 42, pins 48 are positioned through apertures 50 in yoke block 40 until they protrude into upper aperture 42, with each pin 48 extending into one of helical grooves 46 in rotating rod 44. The proximal end of rotating rod 44 is positioned through upper aperture 52 of support block 28, with bushings 54 (FIG. 2) interposed between rotating rod 44 and support block 28 to rotatably support rotating rod 44 relative to support block 28. Referring to FIGS. 2 and 6, snap ring 55 is positioned in annular groove 56 of rotating rod 44 and secured thereto. Snap ring 55 presents a shoulder that prevents rotating rod 44 from being drawn proximally into support block 28. Similarly, nut 58 is threadedly secured to threaded proximal end 60 of rotating rod 44 and presents a shoulder that prevents rotating rod 44 from being drawn distally into support block 28. With support block 28 captured between snap ring 55 and nut 58, rotating rod 44 is prevented from being linearly displaced relative to support block 28, but is rotatable relative thereto.

Magnet 62 is secured to the proximal end of rotating rod 44 for rotation therewith. As pull rod 26 is moved between the position illustrated in FIG. 3A and the position illustrated in FIG. 3B, pins 48 ride along walls forming helical grooves 46 in rotating rod 44 and cause rotating rod 44 to rotate. Each helical groove does not quite helically rotate over a complete 360 degrees of the perimeter of rotating rod 44 from the position of helical grooves 46 occupied by pins 48 in the position illustrated in FIG. 3A to the position occupied by pins 48 in the position illustrated in FIG. 3B; therefore, linear movement of pull rod 26 from one terminal position to the other causes a rotation of rotating rod 44 of less than 360 degrees. Magnet 62 is also rotated less than 360 degrees. Sensor 65 senses the angular position of magnet 62 and thereby signals motor M (FIG. 7) to actuate shaft 382 (FIGS. 7 and 9) and; therefore, worm gear 380. Rotation of worm gear 380 causes rotation of gear sector 378, which is in toothed engagement with worm gear 380. Gear sector 378 is secured to trunnion 16 so that such rotation causes rotation of valve body 14, which is secured for rotation with trunnion 16.

Referring to FIGS. 10-15, a second embodiment of the present disclosure is exemplified as rack and gear actuator 70. Rack and gear actuator 70 includes T-handle 72 sized and arranged to allow a firefighter to grasp the same and pull a portion of the actuator to linearly displace the same from the control panel of a firetruck. Actuator 70 resembles a purely mechanical actuator such as the rack and gear sector actuator available from Elkhart Brass Company, Inc. of Elkhart, Ind., which couples a linearly displaceable T-handle with a sector gear secured to the trunnion of a valve such as a ball valve.

T-handle 72 is moveable from a closed position to an open position, with each of the closed and the open positions corresponding to opposite terminal ends of the linear travel of rack 76. In the closed position, actuator 70 is positioned to actuate an associated valve body, such as valve body 14 (FIGS. 7 and 8) to a closed position, as further described below. In the open position, actuator 70 is positioned to actuate an associated valve body to an open position, as further described below. A mechanical actuator travel distance is defined between the closed position and the open position. The mechanical actuator has a resistance to movement over this travel distance that must be overcome to move the mechanical actuator between the closed position and the open position. In an exemplification of this embodiment, the force required to begin movement of actuator 70 from rest is about 8 lbf, while the force required to maintain movement is about 6 lbf. These force values may be adjusted to provide the desired tactile feedback. The force may be any value in the range of 5-20 lbf, for example. Various force quantifications associated with particular exemplifications of the present disclosure may also be utilized with alternative exemplifications with friction being added as needed to achieve the desired force to operate.

Actuator 70 can be secured relative to a control panel of a firetruck such that T-handle 72 is exposed from the control panel for access by a firefighter, with support block 78 and the associated structure obscured from view behind the control panel. From the position of T-handle 72 illustrated in FIGS. 10, 11, 13 and 15, T-handle 72 can be grasped by the gloved hand of a firefighter and pushed or pulled relative to support block 78. T-handle 72 and rack 76 can thusly be moved between opposed end points of travel defined by snap rings 86, 88 secured to rack 76 and bushings 90 secured to support block 78 (it being understood that snap ring 92 has an inner diameter larger than the outer diameter of snap rings 86, 88). Specifically, a first end point of travel of T-handle 72 and rack 76 secured thereto is defined when snap ring 88 abuts the proximal bushing 90, while the opposite end point of travel of T-handle 72 and rack 76 is defined when snap ring 86 abuts the distal bushing 90. Between these opposed end points of travel of T-handle 72 and rack 76 is defined a mechanical actuator travel distance analogous to the mechanical actuator travel distance D shown in FIG. 3B with respect to actuator 20. This mechanical actuator travel distance is the distance traveled by the mechanical actuator from one end point of travel to the opposite end point of travel. In the exemplification of FIGS. 10-15, the mechanical actuator travel distance is about 7 inches. This extent of travel is associated with the connected valve body maintaining the closed position at one extreme (snap ring 88 abutting proximal bushing 90) and maintaining the open position at the other extreme (snap ring 86 abutting distal bushing 90).

The spaced annular protrusions of rack 76 intermesh with the radially extending teeth of rack gear 96 such that the above described linear movement of rack 76 causes rotation of rack gear 96. Rack gear 96 is rotationally supported in gear reduction cavity 94 of support block 78 and is drivingly connected to first gear 98 of a gear reduction such that a full rotation of rack gear 96 causes a full rotation of first gear 98. First gear 98 is rotationally supported in gear reduction cavity 94 of support block 78 and intermeshed in toothed engagement with second gear 100 which is also rotationally supported in gear reduction cavity 94 of support block 78. Second gear 100 carries magnet 82 fixably secured thereto such that rotation of second gear 100 causes rotation of magnet 82. The gear reduction of actuator 70 is designed such that full movement of rack 76 from its opposing terminal positions causes a rotation of second gear 100 and magnet 82 that is less than 360 degrees. Sensor 75 senses the angular position of magnet 82 and thereby signals motor M (FIG. 7) to actuate shaft 382 and; therefore, worm gear 380. Rotation of worm gear 380 causes a rotation of gear sector 378, which is in toothed engagement with worm gear 380. Gear sector 378 is secured to trunnion 16 so that such rotation causes a rotation of valve body 14. The interaction of magnet 82 and sensor 75 is described in further detail infra.

Rack 76 is supported for the linear movement described above by support block 78. With actuator 70 operably associated with a firetruck, support block 78 will be fixed relative to the fire truck to support actuator 70 relative to the firetruck. Rack 76 is positioned through aperture 80 in support block 78, with bushings 90 interposed between support block 78 and rack 76. As illustrated in FIG. 13, bushings 90 are inserted through opposite ends of elongate aperture 80 until they bottom out against a shoulder formed by a counterbored configuration at either end of aperture 80. Snap ring 92 is thereafter inserted proximally and secured by an internal groove to hold proximal bushing 90 (i.e., the bushing closest to T-handle 72) relative to support block 78. Distal bushing 90 is secured relative to support block 78 by cover pipe 160. Specifically, the proximal end of cover pipe 160 (for the purposes of this document, "proximal" denotes closer to the user, while "distal" denotes farther from the user) is threaded into support block 78 such that distal bushing 90 is trapped between cover pipe 160 and support block 78. In this position, distal bushing 90 protrudes radially internally past the inner diameter of cover pipe 160 to present a distal face against snap ring 86 can bear. As mentioned above, with rack 76 positioned through bushings 90 in longitudinal aperture 80, snap rings 88, 86 can be secured at opposite ends of rack 76 to limit travel of rack 76 relative to support block 78.

Cover pipe 160 may be sealed relative to support block 78, e.g., by an O-ring interposed between cover pipe 160 and support block 78. Similarly, end cap 162 may be sealed relative to cover pipe 160, e.g., by an O-ring interposed between cover pipe 160 and end cap 162. Alternatively, end cap 162 and cover pipe 160 may include compatible National Pipe Thread Taper (NPT) threads to ensure a fluid-tight seal. Cover pipe 160 and end cap 162 cooperate to provide a protective cover to shield rack 76 and the components internal to support block 78 from dust and other debris. At the proximal end of rack 76 an O-ring may be positioned in annular groove 170 and another O-ring position in annular groove 172 so that actuator 70 is completely sealed when in the closed position, with snap ring 88 abutting the proximal end of proximal bushing 90 and the O-ring occupying annular groove 170 bearing radially outwardly in sealing engagement with the wall defining the inner diameter of proximal bushing 90. A channel surrounds gear reduction cavity 94 to accommodate an O-ring in sealing engagement between support block 78 and side plate 74.

At the distal end of rack 76, friction seal 164 is secured for movement with rack 76. In the exemplification illustrated in FIGS. 10-15, a portion of the internal surface of friction seal 164 occupies annular groove 166 formed in rack 76, with snap ring 168 occupying an adjacent annular groove and bearing against friction seal 164 at least during certain movements of rack 76. Friction seal 164 is, in an exemplification thereof, a U-cup seal sized to be friction fit to rack 76. With friction seal 164 secured to rack 76 and rack 76 positioned in cover pipe 160, the outer diameter of friction seal 164 is further friction fit within cover pipe 160, that is, the uncompressed outer diameter of friction seal 164 is larger than the inner diameter of cover pipe 160 such that cover pipe 160 compresses friction seal 164. The fit of friction seal 164 within cover pipe 160 creates a drag force resistant to actuation of rack 76 within cover pipe 160 to further facilitate actuator 70 having the feel of a mechanical actuator and achieving the actuation forces mentioned in this document.

Actuator 70 includes a mechanism for locking a position of rack 76 relative to support block 78. Specifically, springs 84 are secured within gear reduction cavity 94 of support block 78 and extend downward toward rack 76. Rack 76 includes aligned flats 102, on each consecutive annular protrusion of rack 76. When rack 76 is rotated to the position illustrated in FIGS. 10, 11, flats 102 are aligned with the downward extension of springs 84, as illustrated in FIG. 13. In this position, rack 76 can be pulled from support block 78 with the application of the force described above. In this position, rack 76 may be spaced from springs 84 such that rack 76 is freely, linearly displaceable relative to support block 78. If some resistance is desired in this position to produce the desired resistance to movement, then springs 84 may apply a small amount of force to rack 76 in this position. Rack 76 may be rotated from the above described position to the position illustrated in FIG. 14 to lock rack 76 relative to support block 78. In the position illustrated in FIG. 14, flats 102 are no longer aligned with springs 84. In this position, an arcuate perimeter of the annular protrusions of rack 76 extend to deflect the downward extension of springs 84 so that springs 84 press against rack 76 such that application of force in the amount of the above described resistance to movement will not linearly actuate rack 76. In the locked position illustrated in FIG. 14, a typical firefighter will not be able to grasp T-handle 72 and linearly actuate rack 76 without, at a minimum, some manner of significant mechanical advantage. In certain exemplifications, flats may be formed at 180 degree opposed positions to provide 2 unlocked rotational positions.

With gears 96, 98, and 100 operably positioned within gear reduction cavity 94 of support block 78, the side plate 74 can be bolted to support block 78 to retain gears 96, 98, and 100 within gear reduction cavity 94. As illustrated, side plate 74 includes a pair of apertures, one of which will be aligned with and rotationally support a trunnion extending from second gear 100 and supporting magnet 82. In final construction, sensor 75 will be positioned over this aperture to cover magnet 82. A second aperture through side plate 74 will allow passage of a slotted trunnion extending from second gear 98 to rotationally support second gear 98 and provide a visual indicator of the angular position thereof as well as a means to manually rotate the gear set and rack 96.

Referring to FIGS. 16-21, a third embodiment of the present disclosure is exemplified as handwheel actuator 110, which includes handle 112 sized and arranged to allow a firefighter to grasp the same and to rotate the handwheel. Actuator 110 resembles a purely mechanical actuator such as a handwheel actuator available from Elkhart Brass Company, Inc. of Elkhart, Ind., which allows a handwheel to be utilized to rotate a worm gear to displace a gear sector and an associated trunnion and valve body secured thereto. Handwheel 114 is rotatable in both a clockwise and counterclockwise fashion. Referring specifically to FIGS. 19 and 20, threaded shaft 116, which is secured to handwheel 114 for rotation therewith, is supported within support block 118. Threaded shaft 116 could be an ACME type thread. Specifically, a first end of threaded shaft 116 (to which handwheel 114 is secured) is rotatably supported through an aperture in support block 118. With threaded shaft 116 thusly supported, side plate 120 can be aligned with an opposite shaft end of threaded shaft 116 such that the end of threaded shaft 116 is rotatably supported in a blind bore formed in side plate 120. As illustrated in FIG. 19, spring 122 is interposed between a shoulder formed in threaded shaft 116 and an interior wall of support block 118. At the opposite end of threaded shaft 116, washers 124 may be positioned to space threaded shaft 116 from side plate 120 as desired. The opposite ends of the shaft of threaded shaft 116 which occupy apertures in support block 118 and side plate 120 may include annular grooves to accommodate O-rings to seal gear space 126 and/or to provide frictional resistance to the rotation of threaded shaft 116. Additional frictional resistance may be provided by utilizing one or more washers 124 having knurled or otherwise high friction surfaces. Spring 122 will compress the surfaces of washers 124 against the shoulder of threaded shaft 116 bearing against washers 124 and against the interior surface of side plate 120.

Rotation of handwheel 114 causes a one-to-one rotation of threaded shaft 116. Slider 128 includes internal threads compatible with the threads of threaded shaft 116 such that rotation of threaded shaft 116 causes axial displacement of slider 128. Specifically, slider 128 includes keyway 130 (FIG. 19) into which key 132 (FIG. 21), which is secured to or forms a part of support block 118, is positioned so as to prevent rotational movement of slider 128 within gear space 126. With key 132 positioned in keyway 130, rotation of threaded shaft 116 causes axial displacement of slider 128 between the limits of travel defined by the interior wall of support block 118 through which threaded shaft 116 extends and the interior wall of side plate 120 which includes a blind bore rotationally supporting threaded shaft 116. The limits of travel of slider 128 also correspond to the limits of travel of handwheel 114, which corresponds to fully open and fully closed positions of the associated valve body. Throughout this document, "closed" and "open" are used to denote valve positions on opposite ends of the full travel of the valve body within its housing. The "closed" position may not fully eliminate fluid flow (there may be, e.g., some leakage past the valve body in the "closed" position) and the "open" position may not be a position associated with the maximum flow allowable by the valve body.

Slider 128 includes annular protrusions extending about the exterior thereof. These annular protrusions mesh with the teeth of magnet gear 134 on which magnet 136 is fixably secured. In this way, handwheel 114 may be actuated to rotate magnet 136 to cause actuation of a valve body as described infra and with respect to the first and second exemplary embodiments of the present disclosure. This exemplification of the present disclosure is designed such that full travel of slider 128 from one terminal end of its travel to the other will not cause a rotation of magnet gear 134 and magnet 136 secured thereto that is equal to or greater than 360 degrees. In this embodiment, the mechanical actuator travel distance is defined as the number of revolutions of handwheel 114 required to move slider 128 from one terminal end of its travel to the other. In exemplary embodiments this may be 10 revolutions, 9 revolutions, 8 revolutions, 7 revolutions, 6 revolutions, 5 revolutions, 4 revolutions, 3 revolutions, or 2 revolutions. The force required to move handwheel 114 from rest is, in one exemplification, 4 lbf or more. The force required to move handwheel 114 may be in the range of 8-10 lbf.

Referring to FIGS. 22-27, a fourth embodiment of the present disclosure is exemplified as lever actuator 140. Lever actuator 140 includes handle 142 extending from lever 146. Handle 142 is sized and arranged to allow a firefighter to grasp the same and rotate lever 146 about an axis generally orthogonal to the longitudinal axis of lever 146 as further described herein below. Handle 142 is also operable to allow a firefighter to grasp the same and rotate lever 146 about its longitudinal axis to lock the position of lever actuator 140, as will be further described below. Actuator 140 resembles a purely mechanical actuator such as the twist lock actuator available from Elkhart Brass Company, Inc. of Elkhart, Ind., which employs a lockable lever for actuating a valve body.

Figure 25:
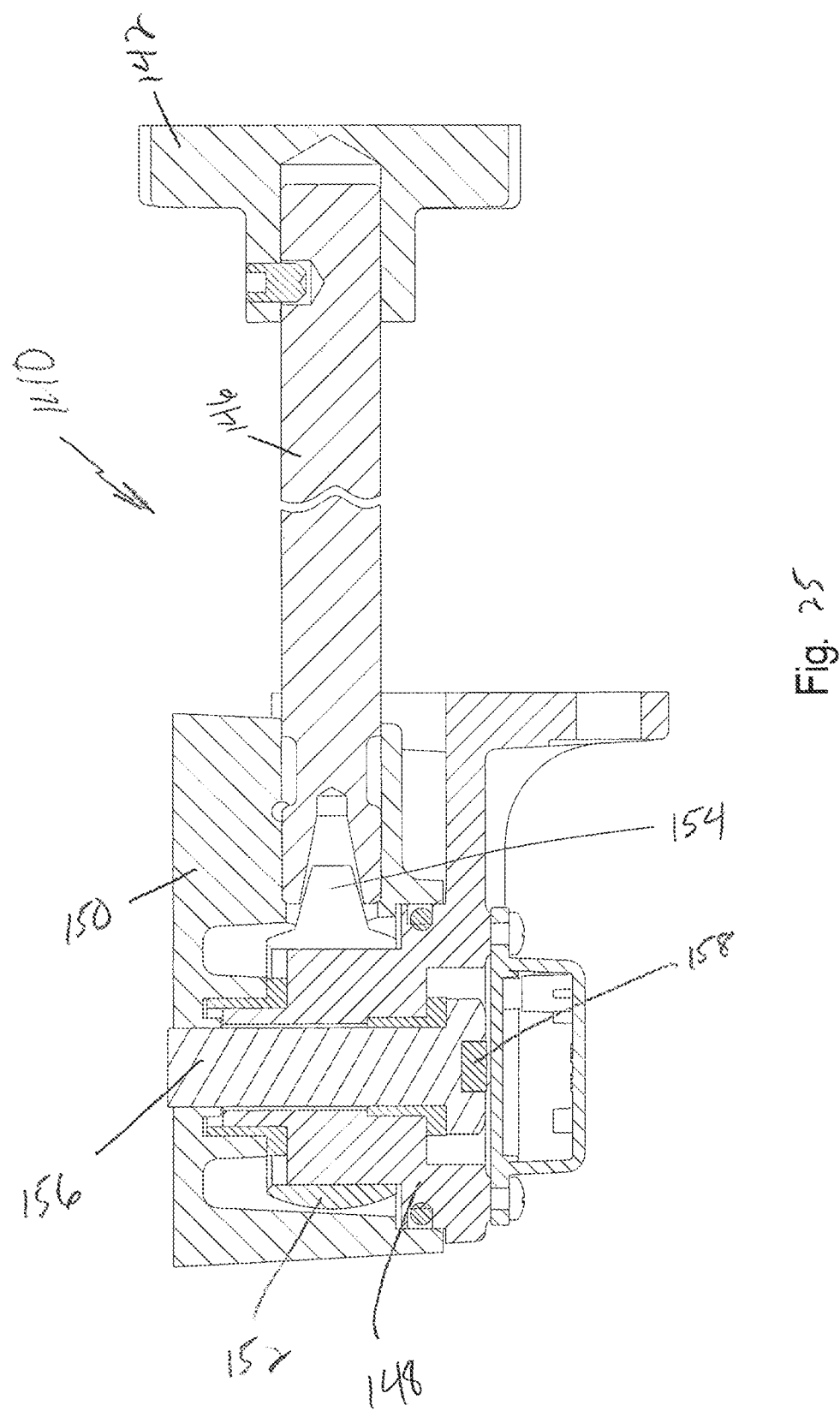
FIG. 25 is a sectional view taken along a section plane including the longitudinal axis of the lever and magnet bolt of the actuator of FIG. 22.
Figure 22:
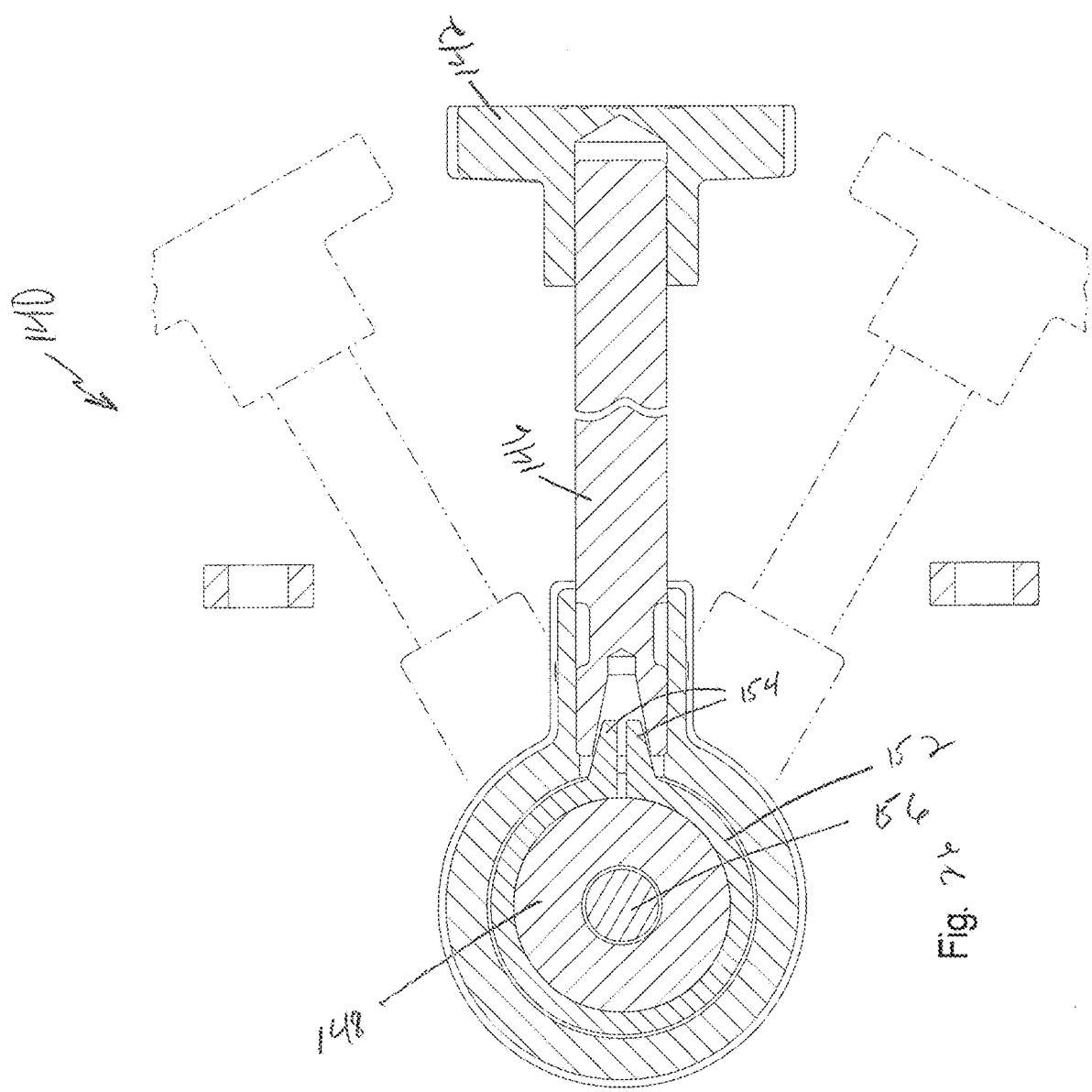
FIG. 22 is a perspective view of a fourth embodiment combination mechanical/electrical valve actuator in accordance with the present disclosure.
Figure 27:
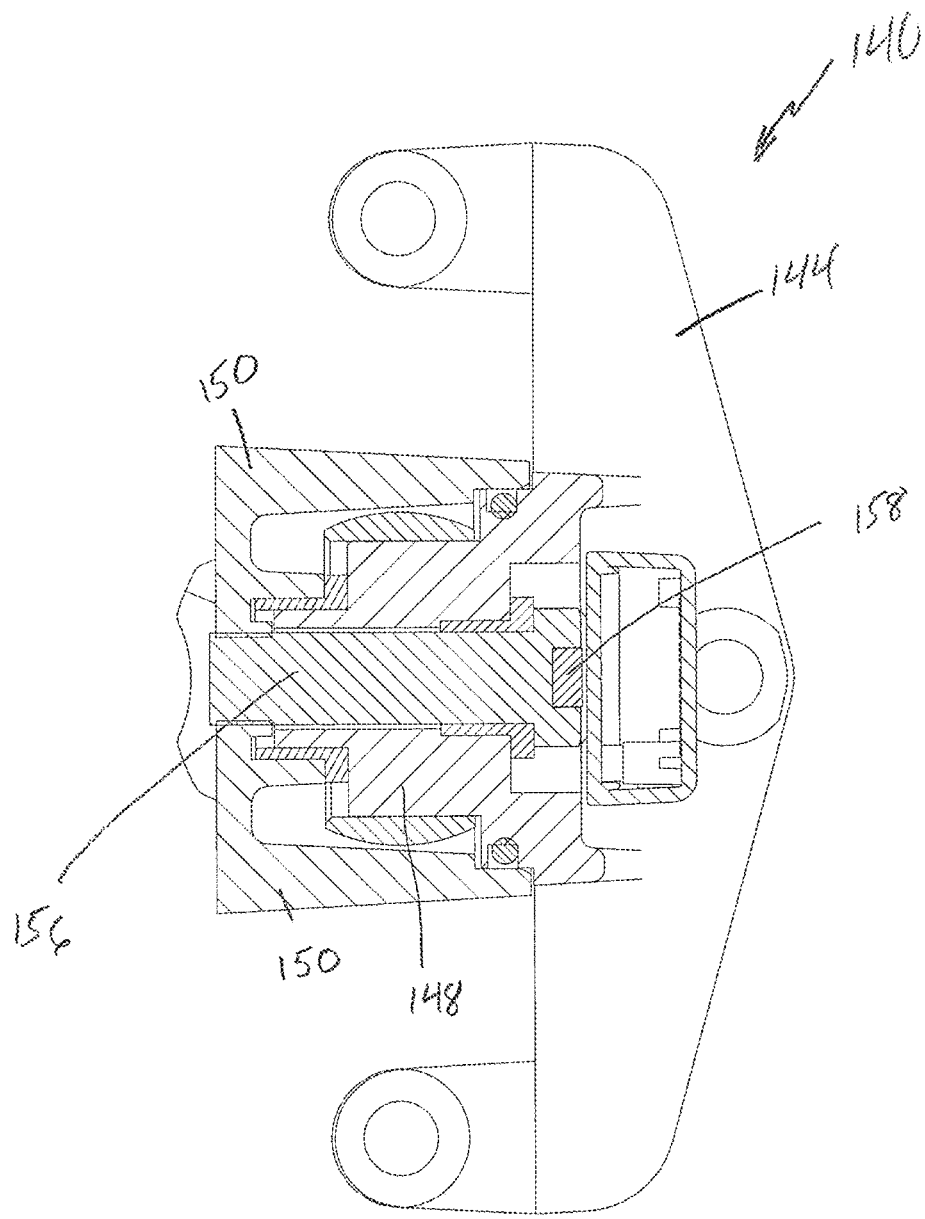
FIG. 27 is a sectional view taken through the longitudinal axis of the magnet bolt of the actuator illustrated in FIG. 22.

Support bracket 144 is securable to a firetruck such that lever 146 protrudes outwardly from the control panel of the firetruck. With support bracket 144 secured relative to the firetruck, lever 146 and carriage 150 are rotatable relative to support bracket 144. Support bracket 144 includes support boss 148 depending therefrom. Support boss 148 rotationally supports carriage 150, with bearings interposed therebetween. As illustrated in FIGS. 25 and 26, lever 146 is threadably engaged in a radially oriented bore formed in a carriage 150. Locking strap 152 includes nose 154 which also extends into the radial bore of carriage 150 into which lever 146 is threadably engaged. Nose 154 of locking strap 152 extends into a blind bore formed in the distal end of lever 146. Locking strap 152 comprises a split ring which, in its normally biased configuration, includes an inner diameter sized to rotate relative to support boss 148 when a force equal to or exceeding the resistance to movement of actuator 140 is applied to handle 142. To lock lever 146 and handle 142 relative to support bracket 144, handle 142 (and, consequently, lever 146) can be rotated about its longitudinal axis to further radially insert lever 146 into the radial bore of carriage 150 previously mentioned. Nose 154 of locking strap 152 includes a conical exterior. The blind bore at the distal end of lever 146 which accommodates nose 154 includes a mating, conical configuration such that further extension of lever 146 into the radial bore of carriage 150 causes the two pieces of nose 154 to be drawn toward one another to reduce the inner diameter of locking strap 152 and lock the same against support boss 148. Locking of locking strap 152 to support boss 148 results in locking of lever 146, handle 142, and carriage 150, owing to the fact that nose 154 occupies a distal blind bore in lever 146.

Carriage 150 carries magnet bolt 156 fixably secured thereto, with magnet 158 secured to the head of magnet bolt 156. As handle 142 and lever 146 is utilized to rotate carriage 150 about support boss 148 of support bracket 144, magnet bolt 156 and; therefore magnet 158 are also rotated. Support bracket 144 defines limits of rotational movement of lever 146 about an axis transverse to the longitudinal axis of lever 146. Such limits of rotation disallow rotation of magnet 158 of up to 360 degrees or more. In one exemplification, such limits of rotational movement are less than 135 degrees. Magnet 158 cooperates with a sensor as described above to effect actuation of an associated valve body. In an exemplary embodiment, lever 146 protrudes 9 inches and requires the application of 8-10 lbf to be moved from rest.

Resistance to movement (i.e., the force required to move from the rest position) of the exemplary mechanical/electrical actuators described herein may be as low as 4, 5, 6, 7, 8, 9, or 10 lbf or as high as 11, 12, 13, 14, 15, 16, 17, 18, 19 or 20 lbf, or within any range between any of the foregoing values. Further, the mechanical actuator travel distance may be as short as 4, 5, 6, or 7 inches or as long as 8, 9, 10, 11 or 12 inches, or within any range between any of the foregoing values.

Having described a number of embodiments of mechanical actuators, the following description provides examples of control systems and devices to control one or more valves with one or more corresponding mechanical actuators. In one embodiment, a control system comprises a controller area network coupled to a local interconnect network by a novel local universal network. A controller area network (CAN) bus is a vehicle bus standard designed to allow microcontrollers and devices to communicate with each other in applications without a host computer. It is a message-based protocol, designed originally for multiplex electrical wiring within vehicles, but is also used in many other contexts. A vehicle may have control units for various subsystems, each control unit communicating with the others over the CAN bus while performing a number of subsystem control functions, e.g. engine control, braking, transmission, etc. A local interconnect network (LIN) is a broadcast serial network used for communication between nodes, comprising one master and typically up to 15 slave nodes. All messages are initiated by the master node with at most one slave replying to a given message identifier. Data is transferred across the bus in fixed form messages of selectable lengths. The master node transmits a header that consists of a break signal followed by synchronization and identifier fields. The slave nodes respond with a data frame that consists of between 1 to 8 data bytes plus cyclic redundancy check (CRC) information.

Figure 28:
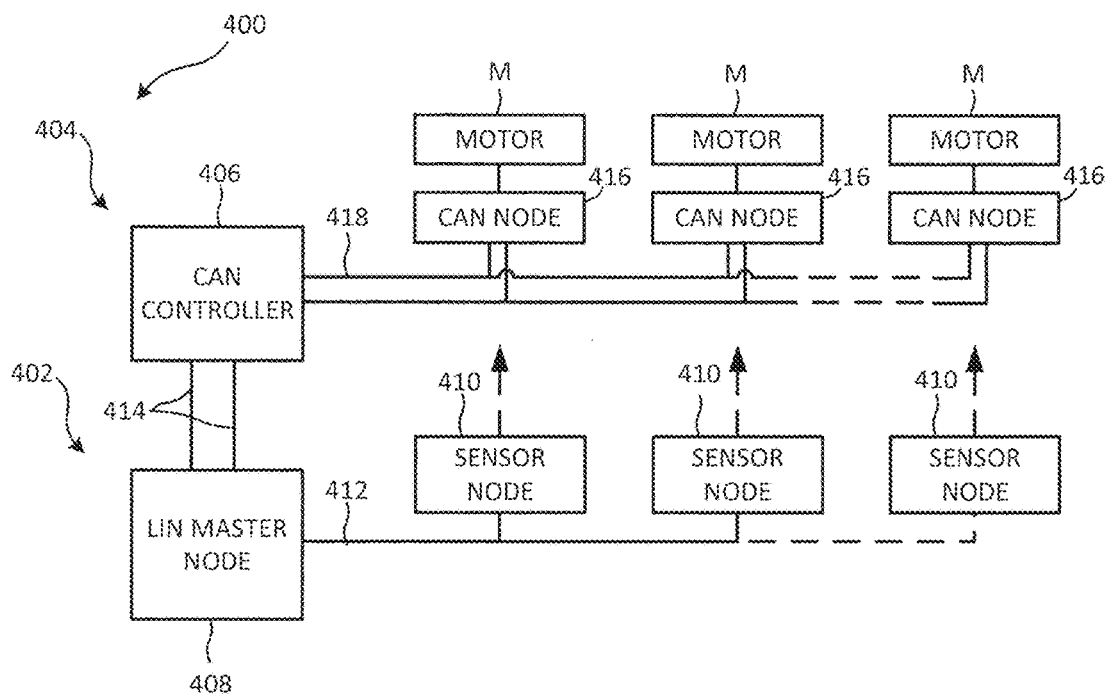
FIG. 28 is a block diagram of an embodiment of a control system communicatively coupling mechanical actuators and motorized valves.

Referring now to FIG. 28, a block diagram of an embodiment of a control system, denoted by numeral 400, is provided. Generally, control system 400 monitors the positions of manually actuated mechanical actuators, such as actuator 20, and changes the positions of corresponding electrically actuated valves, in a proportional matter. For example, if a mechanical actuator is open, control system 400 opens the corresponding valve. If the mechanical actuator is closed, control system 400 closes the corresponding valve. If the mechanical actuator is translated a distance of 50% the span between the open and the closed positions, control system 400 opens the valve 50%. Control system 400 monitors the positions of the mechanical actuators by monitoring a position signal generated by each mechanical actuator. Control system 400 controls the valves by triggering a signal for each motor driving each valve according to the position signal of a corresponding mechanical actuator.

Figure 30:
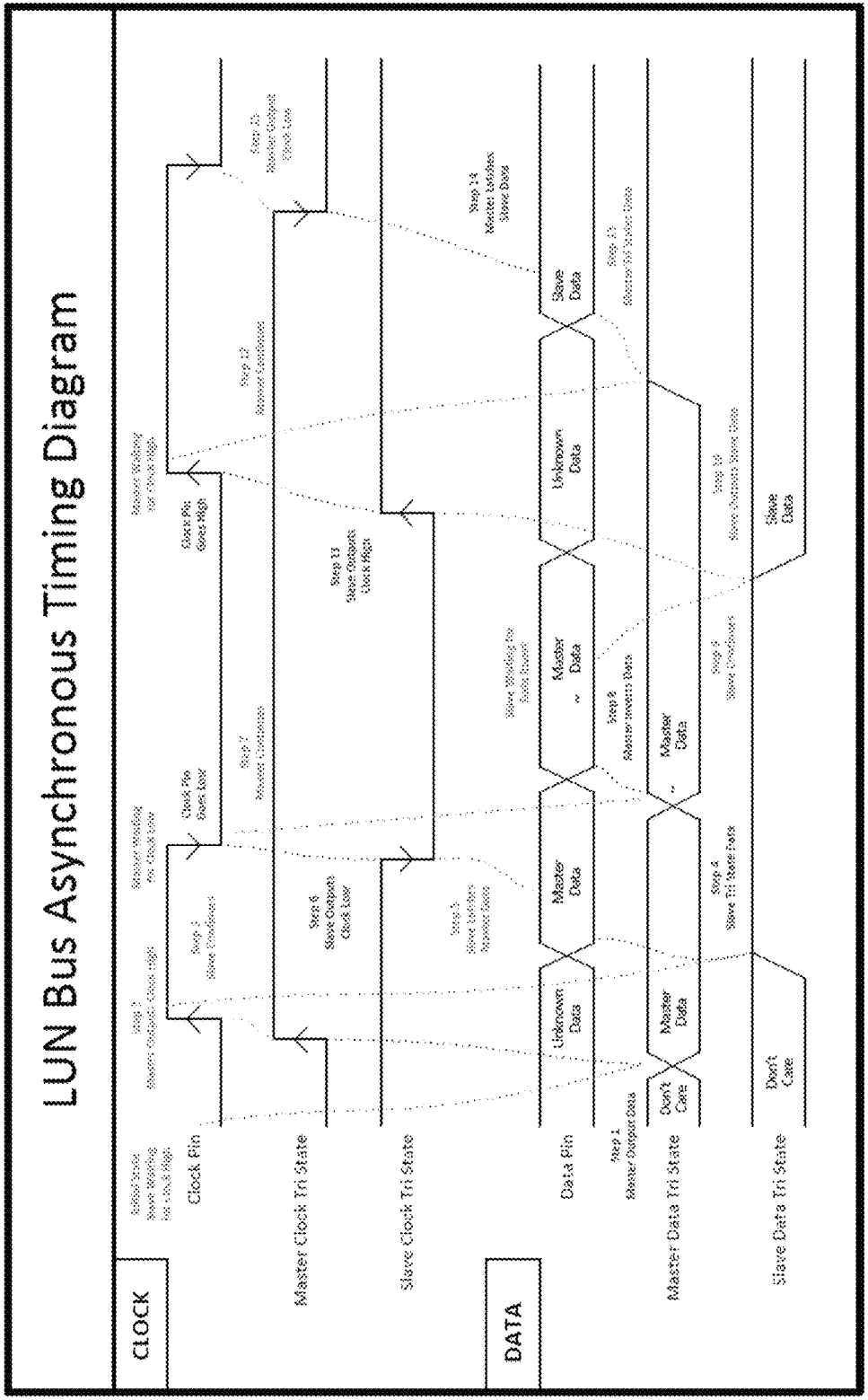
FIG. 30 is a timing diagram of an embodiment of a local universal network coupling the local interconnect network with a controller area network.

To facilitate control of multiple valves with mechanical actuators, while also providing the opportunity to override a particular mechanical actuator from a central control panel, the mechanical actuators are communicatively coupled to a LIN subsystem 402, which is coupled to a CAN controller 406 by a two-wire local universal network (LUN) bus 414, described with reference to FIG. 30, which in turn is communicatively coupled to corresponding CAN nodes 416 by a CAN bus 418. Each CAN node 416 is coupled to a motor M, and each motor M is mechanically coupled to a shaft 382 of a valve, described above with reference to FIGS. 7 and 8.

LIN subsystem 402 comprises a LIN master node 408 and a plurality of sensor nodes 410, each including a sensor 65, communicating over a LIN bus 412 using a known LIN communication protocol. Each sensor 65 of a mechanical actuator, described above with reference to FIGS. 1-3 and below with reference to FIG. 29, generates a position signal having a value corresponding to the position of the mechanical actuator and each sensor node 410 transmits the position signal over LIN bus 412. The sensor may be a magnetic sensor that detects an orientation of magnet 62, 82. The sensor may also be a magnetic sensor that senses movement of magnet 62, 82 and determines an amount of rotation of said magnet. Magnetic sensors to perform these functions are well known in the art. In turn, LIN master node 408 receives and then transmits the position signal to CAN controller 406 over LUN bus 414 using a novel LUN protocol described below. LIN bus 412 comprises a single wire for transferring data and may include a ground wire and power wire. In one variation, power is provided in conjunction with data over the same wire. Therefore LIN bus 412 may comprise two or three wires.

Figure 29:
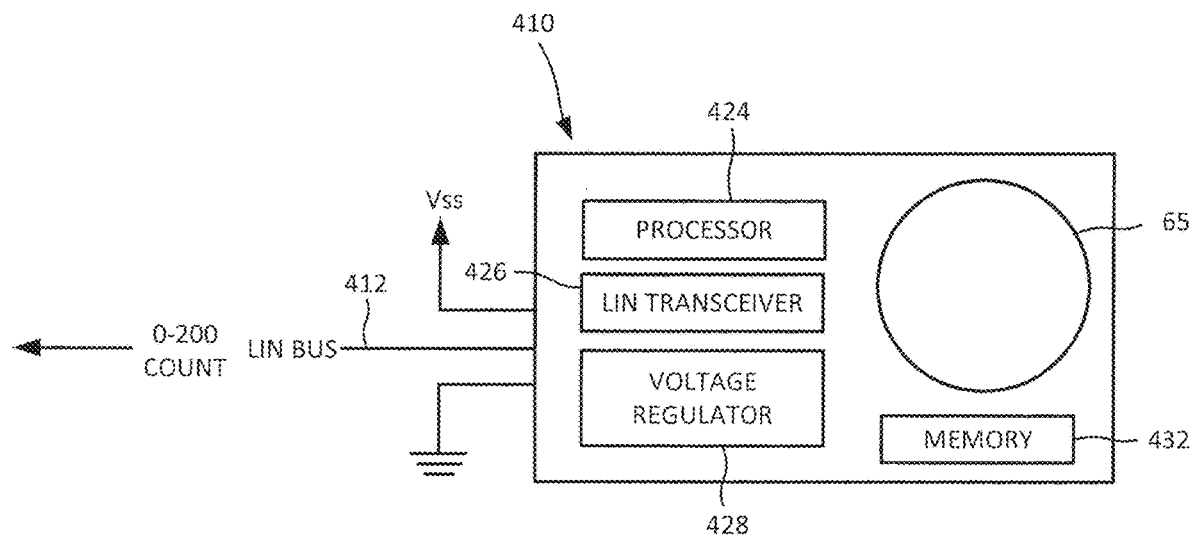
FIG. 29 is a block diagram of an embodiment of a local interconnect network node including a magnetic sensor.

FIG. 29 is a block diagram of an embodiment of sensor node 410, comprising sensor 65, a processor 424, a LIN transceiver 426, a voltage regulator 428, and a memory 432. Memory 432 has embedded therein control logic configured to cause processor 424 to receive from sensor 65 the position signal and to instruct LIN transceiver 426 to communicate the position value over LIN bus 412. Voltage regulator 428 converts the supply voltage Vss to a suitable voltage for LIN transceiver 426, processor 424, and sensor 65.

The term "logic" as used herein includes software and/or firmware executing on one or more programmable processors, application-specific integrated circuit (ASIC), field-programmable gate array (FPGA), digital signal processor (DSP), hardwired logic, or combinations thereof. Therefore, various logic may be implemented in any appropriate fashion and would remain in accordance with the embodiments herein disclosed. As described above with reference to FIG. 29, in one example control logic is embedded in memory, such as a non-volatile computer readable storage medium configured as firmware. In another example, control logic is comprised in an ASIC. In a further example, control logic is implemented in an FPGA.

Sensor 65 detects the rotational angle of a circular magnet using an absolute position Hall effect rotary sensor integrated circuit, and determines the absolute position at power-up without relying on handle motion. The control logic is also configured to cause processor 424 to convert the digital output from the sensor into an absolute position ranging from 0.0% to 100.0%. Default resolution is generated in 0.5% increments, with 0.0% corresponding to full closed, and 100.0% corresponding to fully open.

The calibration and conversion of the rotary angle readings to percentage of handle position will now be described. A calibration application loaded on a computing device may be communicatively coupled with CAN controller 406 to perform, in part, the calibration. The calibration application may present instructions which the user follows to perform the calibration, and may receive values via CAN controller 406 to verify that calibration is occurring correctly. Examples of computing devices include computers and smart devices, including tables and smart phones. In one embodiment, the handle is moved to the fully closed position, and the corresponding absolute angular reading is stored in memory 432. The handle is then moved to the full open position, and the corresponding angular reading is stored in memory 432. The difference in the angular readings, or span, represents the travel distance of the mechanical actuator. The position values range from 0-200, where 0 is closed, 200 is open, and each value therebetween represents a 0.5% change in position. The calibration application may provide a graphical user interface to indicate to the user when to move the handle.

The determination for which mechanical position is open and which is closed is arbitrary and programmable. In one embodiment, the open and close positions are reported to the CAN controller even if the sensor of the mechanical actuator is not entirely open or closed, to compensate for wear, for example. Initially, the span value determined as indicated above is divided by 220 to determine the number of counts in the span. Assuming that the lowest magnitude position is closed and the highest is open, if the angular reading is less than the lowest angular position plus ten counts, this will be reported as 0% mechanical position so that fully closed is reported even if there is slight wear in the mechanical components or the actuator does not fully contact a mechanical stop when closing. Fully open then corresponds to a reading that is greater than the highest magnitude angular position minus ten counts, which is reported as 100% mechanical position. Another number, different than 220, may be used to provide a different safety margin.

LIN sensor node 410 contains a 32 bit unique serial number used for automatic configuration of the node addresses on the LIN bus, which are stored in memory 432. A novel algorithm in the control logic configures each node with a unique address without the addition of additional components or expensive current measuring electronics. LIN master node 408 is responsible for identification of sensor nodes and configuration of programmable sensor features, such as calibration data, programmed node address, programmed protected ID, and Hall effect sensor noise rejection parameters. LIN sensor node 410 is responsible for error detection from the Hall effect sensor, and any error information collected in sent across the LIN bus to LIN master node 408. Examples of errors include: no magnet detected, incorrect type of magnet, analog-to-digital conversion failure, overvoltage and magnetic field clipping. Programmable parameters on LIN master node 408 include dead band calculations, which is the percentage change in mechanical position that must occur before a CAN message is sent to the valve actuator.

LIN master node 408 polls each of LIN sensor nodes 410 and determines if there has been a change of state since the last read. Additionally, LIN sensor nodes 410 may also provide or receive on the LIN bus values corresponding to additional components, such as switches, light emitting diodes, displays, flow sensors, and pressure sensors, which may be coupled to LIN sensor node 410.

Before the system can be used, each LIN node must have a unique address. The following protocol may be implemented to assign unique addresses. Each LIN node supports the LIN commands to change and assign address. In step 1, the protocol loops from address 1 to 125, and requests each LIN node to transmit its serial number. The replies from the LIN nodes may comprise no reply, indicating that the address is free, a correct CRC reply, indicating that there is only one LIN node assigned to the address, or an incorrect CRC reply, indicating that there is more than one LIN node assigned to the address, which is an address conflict. The replies are assigned as status for each address as ADDRESS_FREE, ADDRESS_GOOD, or ADDRESS_CONFLICT. At the end of this procedure the LIN master node will have determined addresses properly assigned, addresses that are free and can be assigned, and addresses with conflicts, the determinations reflected in corresponding status variables, and will then proceed to resolve the address conflicts.

In step 2, the protocol again loops from address 1 to 125, checking the status of each address to find those with conflicts. If there is a conflict, the protocol saves the loop counter as a variable OLD_ADDRESS.

In step 3, the protocol loops again from address 1 to 125 to identify a free address, which it saves as a variable NEW_ADDRESS.

In step 4, the protocol loops through a counter from 0 to 63 and assigns to the variable BIT_NUMBER, which corresponds to a bit in the concatenation of the Manufacturer ID, Component ID and Serial Number, as a 64 bit number. The protocol then sends the command "Conditional change NAD" to the LIN node with the OLD_ADDRESS, supplying the BIT_NUMBER and NEW_ADDRESS. If there is a match, the node with the matching number is reassigned the value of the NEW_ADDRESS and the status ADDRESS_GOOD, resolving the conflict. BIT_NUMBER is then incremented and the process is repeated until all the nodes with conflicts are reassigned new addresses, thereby resulting in unique addresses for each node.

In step 5, starting with address 1, the protocol loops through all the addresses to find the first non-contiguous address, and reassigns that address the next contiguous address. The process is repeated until all the addresses are contiguous.

In step 5, the addresses are verified by transmitting a command and receiving a response from each node without a CRC error. This may be performed a number of times.

LIN master node 408 communicates with CAN controller 406 through the LUN bus, a two-wire fully asynchronous bidirectional interface. Since the interface is fully asynchronous, it is completely interrupt safe and can even be stopped for debugging purposes without loss of data. The base protocol has full error detection on a single bit basis, so it is a guaranteed delivery protocol. Bidirectional transfer size is programmable from 1 bit up to 64 bits, and can be larger than 64 bits. In addition, the interface and protocol guarantee synchronization in time. In other words, the data that is transferred bi-directionally reflects the state of both processors (of LIN master node 408 and CAN controller 406) at the time of the start of the transfer. The protocols can be reflashed onto LIN master node 408 and CAN controller 406 through the CAN bus and the LUN bus. A timing diagram of the LUN protocol is shown in FIG. 30. In some embodiments, CAN controller 406 comprises a communication interface configured to configure the system, to calibrate the system, and to obtain information indicative of the status and performance of the system. Examples of a communication interface include a wireless transceiver and a universal serial bus (USB) connector. As described previously, a computing device including a calibration application may be communicatively coupled to CAN controller 406 to perform the calibration method, as described above. The application may also provide via the graphical user interface queries for the user to provide configuration information for CAN controller 406 and LIN master node 408. The application may also present the position values determined by sensor node 410 and the values provided by CAN controller 406 to CAN nodes 416. Any information available to CAN controller 406 via the CAN bus may also be monitored with the application by providing appropriate control codes to CAN controller 406. In one embodiment, an application provided in a computing system located in the cabin of the vehicle wirelessly monitors operation of CAN controller 406, and the application may be used to override values from CAN sensor nodes, if appropriate, to open or close a valve regardless of the position of the mechanical actuator. For example, in an emergency situation a user may close all the valves simultaneously using the application from the cabin.

Figure 31:
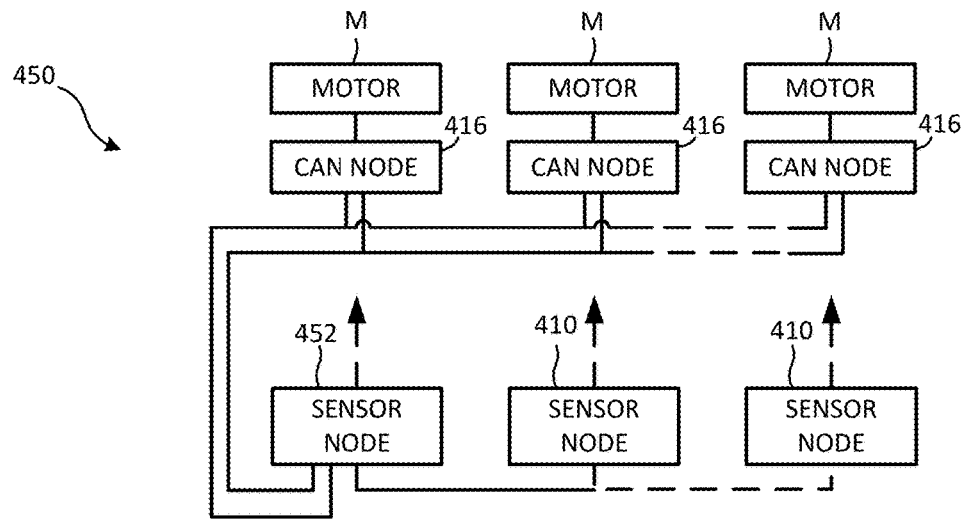
FIG. 31 is a block diagram of another embodiment of a control system communicatively coupling mechanical actuators and motorized valves.
Figure 32:
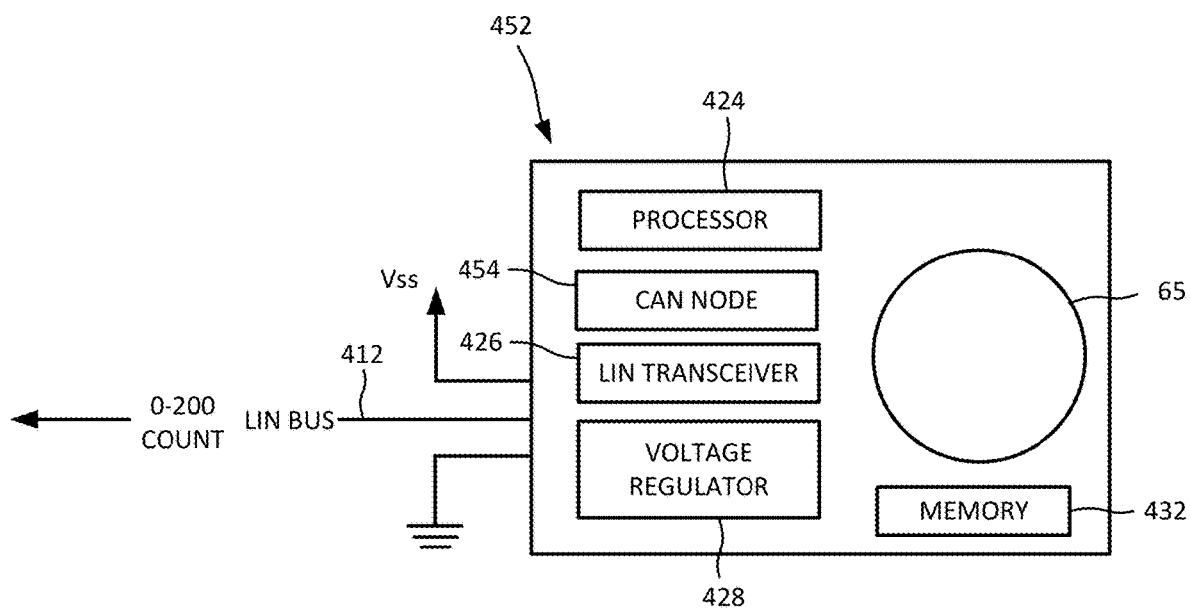
FIG. 32 is a block diagram of another embodiment of a local interconnect network node including a magnetic sensor.

It is not necessary that each system comprise many valves and many actuators. In some embodiments, a sensor node may comprise a LIN node and also a CAN node, thereby simplifying the system. The "fully loaded" sensor node can communicate with the CAN network and thereby with at least one valve, and also to the LIN network, thereby communicating with at least one sensor, as desired. An example of a system including two sensor nodes, one of which is fully loaded, is described with reference to FIG. 33. Referring now to FIGS. 31 and 32, a block diagram of an embodiment of a control system, denoted by numeral 450, is provided. Generally, control system 450 monitors the positions of manually actuated mechanical actuators, such as actuator 20, 70, and changes the positions of corresponding electrically actuated valves, in a proportional matter. The mechanical actuators are communicatively coupled to a LIN subsystem including a sensor node 452 and sensor nodes 410. Sensor node 452 is coupled to the CAN network including CAN nodes 416 coupled to motors M. Each motor M is mechanically coupled to a shaft of a valve, as described previously.

Figure 33:
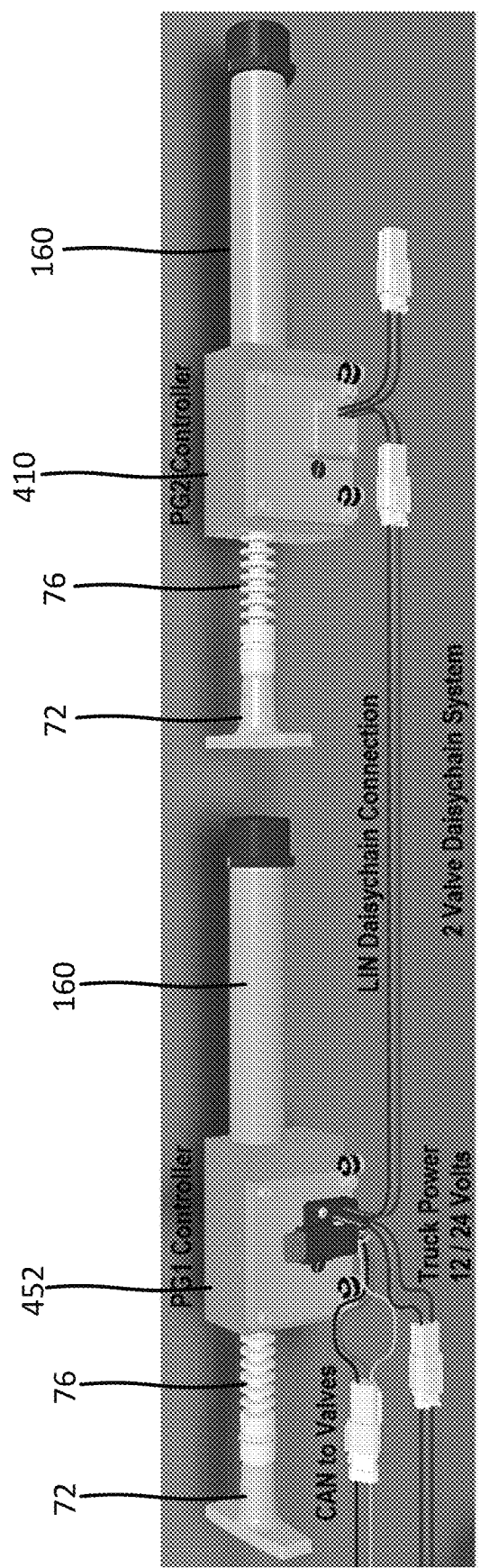
FIG. 33 is a perspective view of the local interconnect network node including a magnetic sensor connected to another local interconnect network node including a magnetic sensor.

Sensor node 452 comprises a sensor 65, 75, processor 424, voltage regulator 428, memory 432, LIN transceiver 426 communicatively coupled with a CAN node 454. Processor 424 and memory 432 are configured to generate the control signal to operate the motor and provide it to CAN node 454 for distribution to the CAN bus, and also configured to receive information from sensor nodes 410 and also provide it to CAN node 454 for distribution to the CAN bus. If only one sensor is required, sensor node 452 has all the components necessary to communicate sensed information to the CAN bus to operate at least one valve. Such a system is disclosed in FIG. 33, showing a LIN daisychain connection between sensor node 410 and sensor node 452, and a set of wires to connect sensor node 452 to the CAN bus and thereby to the valves. The LIN subsystem can be initialized as described with reference to FIG. 28.

While this invention has been described as having exemplary designs, the present invention may be further modified within the spirit and scope of this disclosure. Further, this application is intended to cover such departures from the present disclosure as come within known or customary practice in the art to which this invention pertains.

What is claimed is:

1. An electro-mechanical actuator comprising:
a mechanical actuator having a closed position, an open position, and an intermediate position therebetween, the mechanical actuator moveable over a travel distance to and between said closed position and said open position, said mechanical actuator having a resistance to movement over said travel distance between said closed position and said open position that must be overcome to move said mechanical actuator between said closed position and said open position, said mechanical actuator including a rotatable element configured to rotate responsive to movement over the travel distance; and
a sensor device including a sensor configured to detect an angular position of the rotatable element, and a transceiver configured to transmit a value corresponding to the angular position over a network to open a valve an amount proportional to the value.

2. The electro-mechanical actuator of claim 1, further comprising control logic configured to translate the angular position to the value.

3. The electro-mechanical actuator of claim 1, further comprising a local universal network.

4. The electro-mechanical actuator of claim 1, wherein said rotatable element has a range of motion of less than 360 degrees of rotation.

5. The electro-mechanical actuator of claim 1, wherein the network comprises a local interconnect network (LIN) coupled to a controller area network (CAN).

6. The electro-mechanical actuator of claim 5, wherein the LIN is coupled to the CAN by a local universal network (LUN).

7. The electro-mechanical actuator of claim 6, wherein the LIN configured to communicate values corresponding to angular positions of a plurality of electro-mechanical actuators to a plurality of valves coupled to the CAN.

* * * * *